United States Patent [19]

Arai

[11] Patent Number: 4,897,723
[45] Date of Patent: Jan. 30, 1990

[54] CIRCUITRY FOR AND METHOD OF GENERATING VERTICAL DRIVE PULSE IN VIDEO SIGNAL RECEIVER

[75] Inventor: Hiromi Arai, Kumagaya, Japan

[73] Assignee: SanyoElectric Co., Ltd., Moriguchi, Japan

[21] Appl. No.: 352,524

[22] Filed: May 16, 1989

[30] Foreign Application Priority Data

May 17, 1988 [JP] Japan .................... 63-119657
May 19, 1988 [JP] Japan .................... 63-122318

[51] Int. Cl.$^4$ ............................................. H04N 5/04
[52] U.S. Cl. .................................... 358/158; 358/140; 358/148
[58] Field of Search ............... 358/140, 148, 152, 158, 358/181, 244

[56] References Cited

U.S. PATENT DOCUMENTS 4,231,064 10/1980 Uchida .
4,489,343 12/1984 Hosoya .
4,701,800 12/1987 Akimoto et al. ............. 358/140 X
4,769,704 9/1988 Hirai et al. .................... 358/158 X

FOREIGN PATENT DOCUMENTS 0249987 6/1987 European Pat. Off. .
59-193679 11/1984 Japan .

Primary Examiner—James J. Groody
Assistant Examiner—Victor R. Kostak

Attorney, Agent, or Firm—Armstrong, Nikaido, Marmelstein, Kubovcik & Murray

[57] ABSTRACT

The vertical drive pulse generator comprises a gate (59) passing a vertical synchronizing signal included in received video signals in response to a control signal, a counter (60; 360) counting a clock signal (CL) of $2f_H$ ($f_H$: a frequency of a horizontal synchronizing signal) to generate a plurality of timing signals, a 50/60 decider (65; 365) deciding whether the vertical synchronizing signal from the gate is of the NTSC or the PAL system and a synchronization decoder (66; 366) detecting whether the counter is reset in response to the vertical synchronizing signal passed through the gate or by a timing signal outputted by itself. One of the timing signals from the counter is selected in response to the outputs of the 50/60 decider (365; 65) and the synchronization detector (66; 366) and applied to the gate, thereby to make the gate pass a signal only when the control signal is received. When the 50/60 decider indicates that the arriving vertical synchronizing signal is of the NTSC system, the gate circuit (67; 367) opens during a period of 224 H to 296 H (H: a horizontal scanning period), while detecting the PAL system to open the gate during a period of 268 H to 356 H. when a step-out detection circuit (66; 366) detects a step-out state, the gate opens during 224 H to 356 H. The vertical drive pulse generator further comprises a phase comparator (422) which selects and generates a signal for defining a gate period of either 260.5 H to 264 H for NTSC system or 310.5 H to 314 H for PAL system.

19 Claims, 17 Drawing Sheets

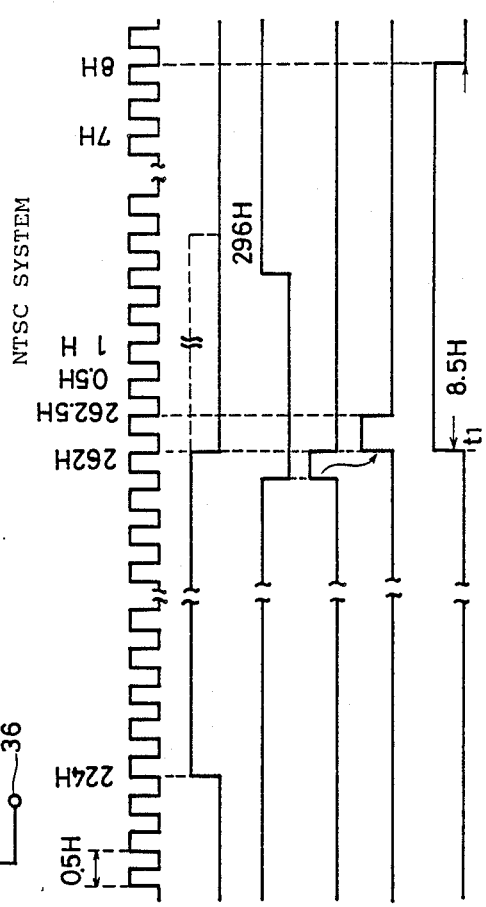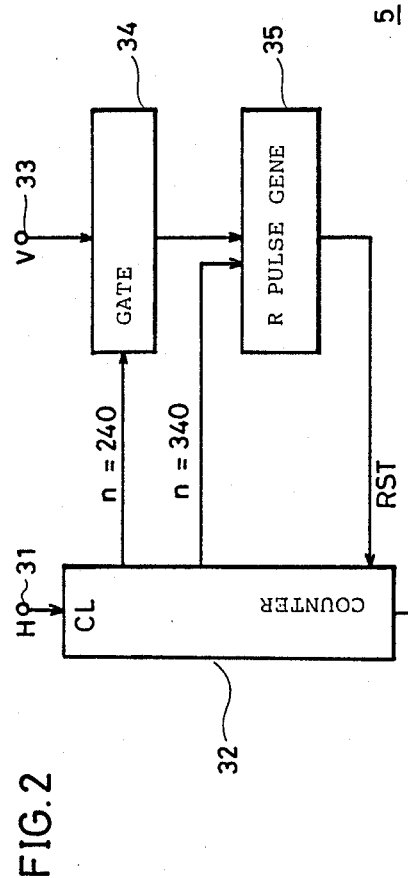
FIG.2
FIG.4
(a) C L
(b) φ6
(c) VERTICAL SYNC SIGNAL
(d) OUTPUT OF GATE 59
(e) RESET PULSE
(f) VERTICAL DRIVE SIGNAL

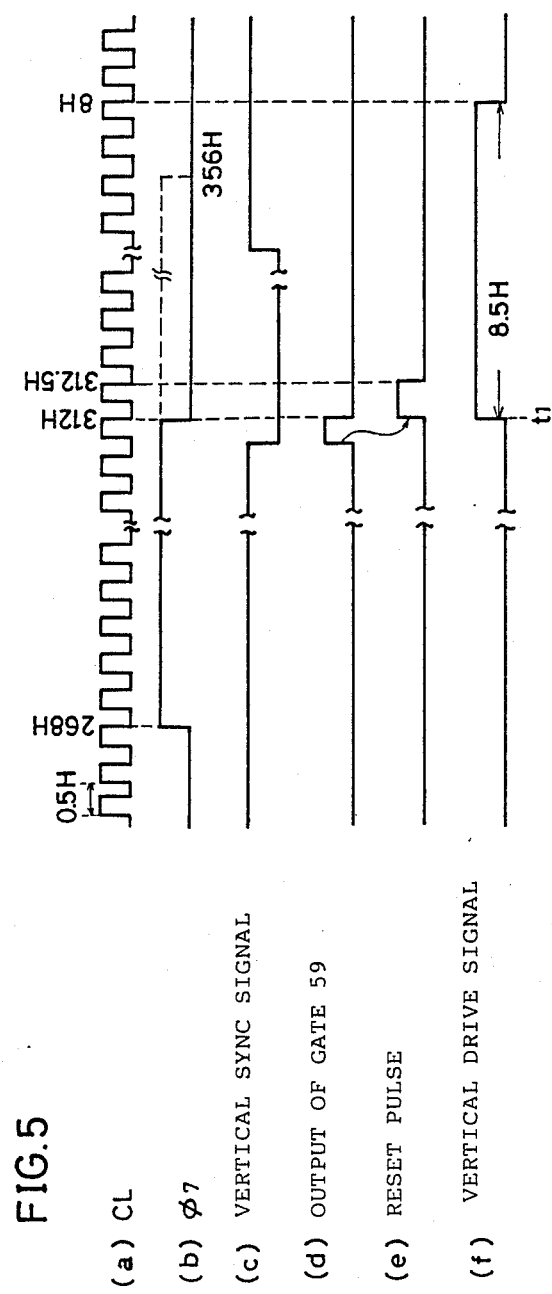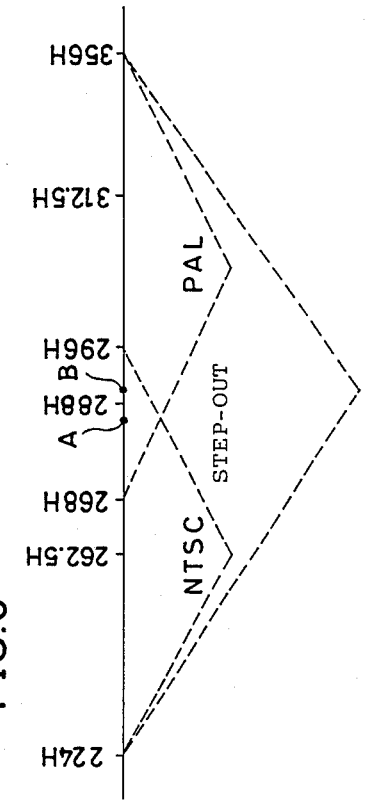

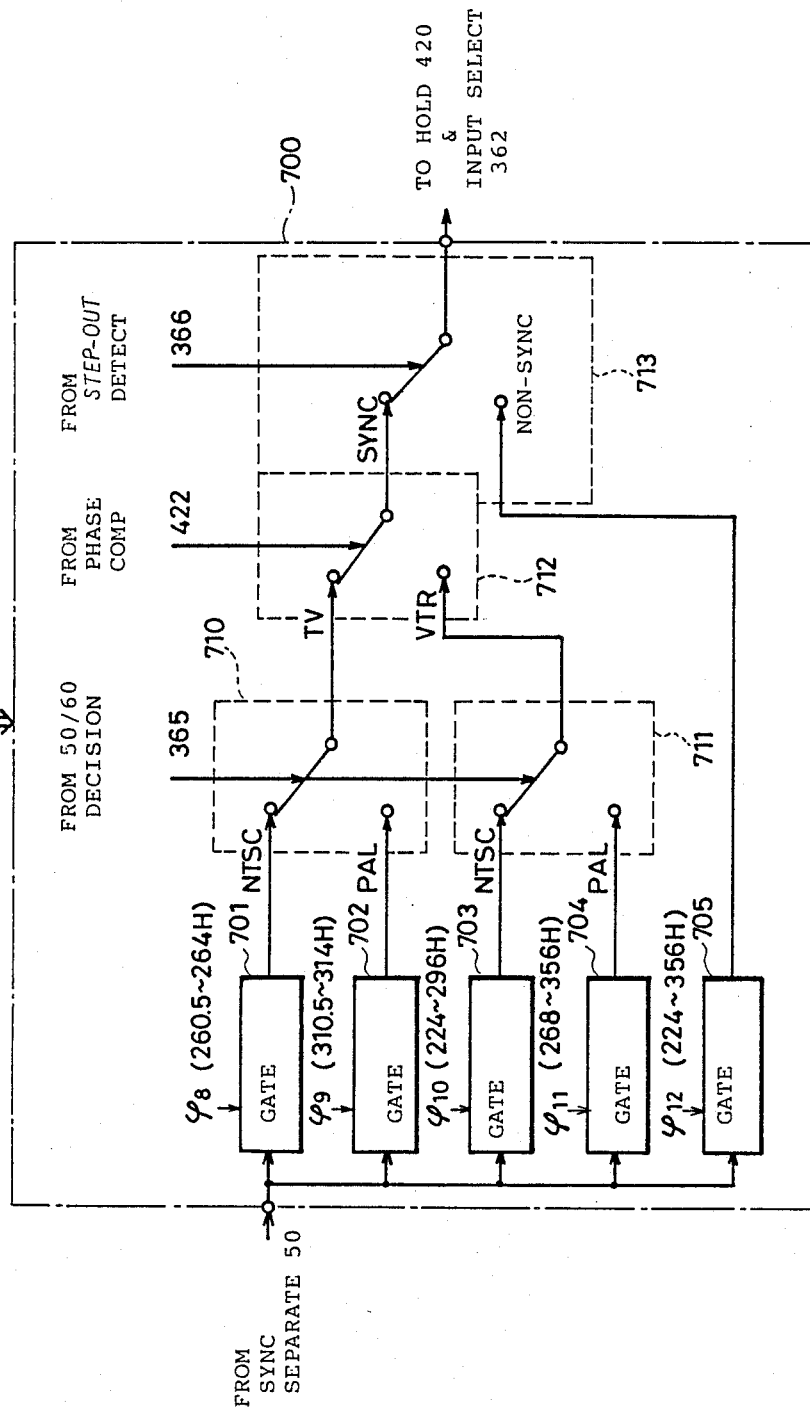

CIRCUITRY FOR AND METHOD OF GENERATING VERTICAL DRIVE PULSE IN VIDEO SIGNAL RECEIVER

BACKGROUND OF THE INVENTION

1. Field of the Invention

The present invention relates to circuitry for and a method of generating vertical drive pulses in a video signal receiver, and more particularly, it relates to circuitry for and a method of regularly correctly generating vertical drive pulses for video signal broadcasting systems having different cycles of vertical synchronizing signals.

2. Description of the Background Art

A television receiver extracts horizontal and vertical synchronizing signals from a received video signal and performs horizontal and vertical scanning on a display screen (CRT: cathode ray tube) in synchronization with the extracted horizontal and vertical synchronizing signals.

If the vertical synchronizing signal is dropped out for a short period by a weak electric field etc. or spurious noise is caused in a vertical blanking period, a step-out state (out-of-synchronization state) in a vertical direction, instability in vertical synchronization, incomplete interlace scanning and the like may be caused.

A vertical synchronization circuit of a countdown system is well known as circuit structure for removing the aforementioned disadvantages.

FIG. 1 schematically illustrates overall structure of a television receiver which employs a conventional vertical synchronization circuit of the countdown system. Referring to FIG. 1, Y/C processing circuit (luminance/chrominance processing circuit), a VIF (video signal intermediate frequency detector/amplifier), an SIF (sound signal intermediate frequency amplifying circuit) and a vertical/horizontal deflection circuit parts are integrally formed on one IC (integrated circuit). A tuner selects a video signal of a desired frequency band from a high-frequency signal received through an antenna 14, and supplies the same to a VIF (video intermediate frequency signal detector/amplifier) 2. A video signal intermediate frequency signal derived from the VIF 2 is processed in three circuit parts.

The first circuit part is to derive a sound signal, and includes an SIF 9 which receives the output from the VIF 2 for detecting and amplifying the sound intermediate frequency signal. The output rom the SIF 9 is supplied to a speaker 13.

The second circuit part is to process a luminance signal and a chrominance signal for deriving desired chrominance signals of red (R), green (G) and blue (B), and is formed by a Y/C processing circuit 4. The output of the Y/C processing circuit 4 is supplied to a CRT 10.

The third circuit part is to separate horizontal and vertical synchronizing signals included in a composite video signal from the VIF 2, thereby to derive signals for defining horizontal and vertical scanning periods in the CRT 10 on the basis of respective separated and extracted horizontal and vertical synchronizing signals. This circuit part includes a sync separation circuit 3 which separates and extracts the horizontal and vertical synchronizing signals included in the composite video signal from the VIF 2.

A circuit part for deriving the vertical synchronizing signal includes a vertical drive pulse generator 5 which extracts the vertical synchronizing signal from the synchronizing signals received from the sync separation circuit 3 and generates a vertical drive pulse corresponding to the vertical synchronizing signal and a vertical deflection circuit 6 which generates a sawtooth-like signal in response to the vertical drive pulse from the vertical drive pulse generator 5. The output from the vertical deflection circuit 6 is supplied to a vertical deflection coil 11.

A circuit part for defining horizontal scanning is formed by a horizontal AFC circuit 7 which extracts the horizontal synchronizing signal from the synchronizing signals received from the sync separation circuit 3 and extracts a horizontal synchronizing pulse signal corresponding to the extracted horizontal synchronizing signal and a horizontal deflection circuit 8 which generates a sawtooth-like pulse signal for defining a horizontal scanning period in response to the horizontal synchronizing pulse signal received from the horizontal AFC circuit 7. The output from the horizontal deflection circuit 8 is supplied to a horizontal deflection coil 12.

The vertical drive pulse generator 5 includes a vertical synchronizing signal separation circuit 21 which separates and extracts the vertical synchronizing signal from the synchronizing signals extracted by the sync separation circuit 3 and a vertical countdown counter circuit 22 which divides a frequency $2f_H$ ($f_H$: horizontal scanning frequency, i.e., frequency of the horizontal synchronizing signal of about 15.7 KHz) supplied from the horizontal AFC circuit 7 and generates the vertical drive pulse in response to the signal from the vertical synchronizing signal separation circuit 21.

The horizontal AFC circuit 7 is adapted to derive a signal having a frequency corresponding to the horizontal synchronizing signal from the synchronizing signals separated by the sync separation circuit 3. This horizontal AFC circuit 7 includes a phase comparator 23 which compares the phases of the signal from the sync separation circuit 3 and the output from a ½ frequency divider 26, a low-pass filter 24 which passes a low-frequency component of the output from the phase comparator 23, a voltage controlled oscillator 25 which changes its oscillation frequency in response to the output from the low-pass filter 24, and the ½ frequency divider 26 which frequency-divides the output of the voltage controlled oscillator 25 and outputs the same. The central oscillation frequency of the voltage controlled oscillator 25 is set at $2f_H$. This horizontal AFC circuit 7 forms a PLL. Such circuit structure for generating a vertical drive pulse through a vertical countdown counter circuit is shown in U. S. Pat. No. 4,231,064 and European Patent application publication No. 249987A2, for example. These prior arts show circuit structure which shapes a vertical synchronizing signal into correctly defined pulse width even if noise is caused at immediately precede the vertical synchronizing signal.

This countdown system takes the advantage of the fact that there is a fixed relation between a horizontal scanning cycle and a vertical scanning cycle (cycle of a vertical synchronizing signal). The ratio of the vertical scanning cycle to the horizontal scanning cycle is 2:525 in the NTSC system, while this ratio is mainly 2:625 in the PAL and SECAM systems. Such a prescribed ratio is employed to frequency-divide a stably generated horizontal synchronizing signal and to generate a vertical drive pulse in correspondence to a prescribed vertical synchronizing signal.

In the prior art structure, the output of a vertical sync separation circuit is passed through a gate circuit only for a prescribed period in response to the output of a counter circuit which frequency-divides a clock signal corresponding to a horizontal synchronizing signal. In the prior art, the phase of an externally supplied vertical synchronizing signal is compared with that of a timing signal outputted from the counter, to reset the counter circuit by the external vertical synchronizing signal and generate a vertical drive pulse or to reset the counter circuit by a timing signal from a counter on the basis of the result of such phase comparison. When the phase of the external vertical synchronizing signal is varied in special reproduction mode in a VCR (video cassette recorder), for example, the counter circuit is reset by the externally supplied vertical synchronizing signal all the time.

Increasingly and widely employed is circuit structure which can be commonly applied to two different broadcasting systems (NTSC and PAL systems), as shown in Japanese Patent Laying-Open Gazette No. 193679/1984, for example. This prior art discloses structure of discriminating the broadcasting system by deciding the cycle of an externally supplied vertical synchronizing signal through phase difference between the output of a counter circuit and the vertical synchronizing signal.

FIG. 2 schematically illustrates the structure of a gate circuit part in a conventional apparatus for automatically discriminating a television broadcasting system. The part shown in FIG. 2 corresponds to the part of the vertical countdown counter circuit 22 shown in FIG. 1. Referring to FIG. 2, a vertical drive pulse generator (vertical countdown counter circuit 22) includes a counter circuit 32, a gate circuit 34 and a reset pulse generator 35. The counter circuit 32 receives a horizontal synchronizing signal supplied through an input terminal 31 at its clock input CL and frequency-divides the horizontal synchronizing signal, to generate a signal in predetermined timing. The gate circuit 34 passes a vertical synchronizing signal supplied through another input terminal 33 in response to a control signal supplied from the counter circuit 32. The reset pulse generator 35 generates a reset pulse RST for resetting the counter circuit 32 in response to the vertical synchronizing signal from the gate circuit 34.

The counter circuit 32 is reset in response to the reset pulse RST from the reset pulse generator 35, and thereafter re-counts the horizontal synchronizing signal supplied from the input terminal 31. The counter circuit 32 shuts off the gate circuit 34 up to a period in which arrival of an external vertical synchronizing signal is expected, thereby to prevent the circuits of subsequent stages from adverse influence exerted by noise from the input terminal 33 or the like. Operation is now briefly described.

The counter circuit 32 counts the horizontal synchronizing signal (corresponding to a clock signal having a frequency $f_H$, which is ½ of the frequency $2f_H$ supplied from the horizontal AFC circuit 7 shown in FIG. 1) received from the input terminal 31. When the count n reaches 240, at which arrival of a vertical synchronizing signal of the NTSC or PAL system is expected, the counter circuit 32 generates a gate signal for electrically opening the gate circuit 34. If a normal vertical synchronizing signal is supplied to the gate circuit 34 through the input terminal 33 in this state, the vertical synchronizing signal of the NTSC system or that of the PAL system is passed through the gate circuit 34 and supplied to the pulse generator 35 at timing of $n=262.5$ or $n=312.5$. Hence, the pulse generator 35 generates the reset pulse RST in response to the supplied vertical synchronizing signal and supplies the same to the counter circuit 32. The counter circuit 32 generates a vertical drive pulse in response to the reset pulse RST, and supplies the same to a vertical deflection circuit (6 in FIG. 1). The counter circuit 32 is reset by the reset pulse RST and then resumes counting the horizontal synchronizing signal, to repeat operation similar to the above.

When no vertical synchronizing signal is supplied to the input terminal 33, the counter circuit 32 generates a pulse at $n=340$, and supplies the same to the reset pulse generator 35. The reset pulse generator 35 generates a reset pulse in response to this control signal received from the counter circuit 32 at $n=340$, and resets the counter circuit 32. Thus, the counter circuit 32 enters a self-reset state (a state reset by the control signal generated from the counter itself). In this state the television picture flows vertically since generation timing of the vertical drive pulse for the television picture corresponds to $n=340$. Identification of the broadcasting system is performed by phase comparison of the output of the gate circuit 34 and a pulse signal generated at $n=240$ or 288 from the counter circuit 32.

According to the circuit structure shown in FIG. 2, the circuits of subsequent stages can be prevented from malfunctions by noise caused by a weak electric field or the like included in a composite video signal by opening the gate circuit 34 only for a specific period with respect to the externally supplied vertical synchronizing signal.

In the structure shown in FIG. 2, the gate circuit 34 is adapted to be commonly employable for both the NTSC and PAL broadcasting systems. Therefore, starting of a gate period for opening the gate circuit 34 is set at the timing of $n=240$, since the vertical synchronizing signal of the NTSC system generally arrives at $n=262.5$. However, when the vertical synchronizing signal of the PAL system is received, noise immunity is deteriorated if the gate circuit 34 is opened at $n=240$ since this vertical synchronizing signal normally arrives at $n=312.5$. When noise is caused in the video signal of the PAL system to appear in a position preceding generation timing of the vertical synchronizing signal, the noise is passed through the gate circuit 34 to cause a malfunction of the counter circuit 32.

Japanese Patent Laying-Open Gazette No. 193679/1984 discloses structure of setting the opening period of the gate circuit 34 within a range of 244 H to 287 H (H: one horizontal scanning period) for the NTSC system and within a range of 288 H to 340 H for the PAL system. In this prior art, however, a critical point for discrimination between the PAL and NTSC systems is set between 287 H and 288 H, and hence the broadcasting system cannot be discriminated if the vertical synchronizing signal is generated in this boundary region in special playing mode of a VCR, for example, or the vertical synchronizing signal is cyclically varied in the vicinity of the discrimination critical point. Thus, the vertical drive pulse may be generated in accordance with an erroneous broadcasting system to cause vertical flow of the picture due to a step-out phenomenon.

U.S. Pat. No. 4,489,343 discloses structure in which periods for opening the gate circuit are varied with the NTSC and PAL systems. In this prior art, the gate period is 240 H to 288 H in the NTSC system and 288 H to 352 H in the PAL system in VCR playing mode. On the other hand, the gate period is set in a range of 256 H to 272 H in the NTSC system and in a range of 304 H to 320 H in the PAL system in receiving of broadcasting signals. In this prior art, however, when a vertical synchronization signal is generated in the range for the NTSC system (below 288 H), the counter circuit is reset at counting of 352, and hence synchronization is instabilized to cause vertical flow of the picture.

SUMMARY OF THE INVENTION

An object of the present invention is to provide improved vertical drive pulse generator and vertical drive pulse generating method.

Another object of the present invention is to provide a vertical drive pulse generator which can easily cope with video signals of different broadcasting systems.

Still another object of the present invention is to provide a vertical drive pulse generator which is excellent in noise immunity and speedy in synchronization pull-in operation.

A further object of the present invention is to provide a vertical drive pulse generator which can reliably and stably generate a synchronized vertical drive pulse even if an arriving vertical synchronizing signal is varied in the vicinity of a discrimination critical point between broadcasting systems.

A further object of the present invention is to provide a method of reliably and stably generating synchronized vertical drive pulses for video signals of different broadcasting systems.

A further object of the present invention is to provide a method of stably generating a synchronized vertical drive pulse against noise, variation of an externally arriving vertical synchronizing signal and a different cycles of incoming vertical synchronizing signals.

A vertical drive pulse generator according to the present invention includes a gate circuit which passes a vertical synchronizing signal included in an externally supplied video signal and a counter circuit which generates control signals for defining gate periods of the gate circuit. The counter circuit counts a clock signal having a frequency integral times that of a horizontal synchronizing signal included in the video signal and outputs at least first, second and third control signals. The first control signal defines a gate period corresponding to a first broadcasting system and the second control signal defines a gate period corresponding to a second broadcasting system, while the third control signal defines a gate period corresponding to both the first and second broadcasting systems. Gate period defined by the first and second control signals preferably overlap with each other in a certain range, while the third control signal periods a gate period including the gate periods defined by the first and second control signals.

The vertical drive pulse generator further includes a control signal selection circuit which selectively passes a control signal generated from the counter circuit and supplies the same to the gate circuit, an input selection circuit which selectively passes one of the output from the gate circuit and pulses for resetting generated from the counter circuit and having vertical synchronizing signal cycles corresponding to respective first and second broadcasting systems, and a reset pulse generator which generates a reset pulse in response to the output of the input selection circuit. The reset pulse outputted from the reset pulse generator resets counting operation of the counter circuit. The counter circuit generates a vertical drive pulse in response to the reset pulse. In order to decide to which broadcasting system the incoming vertical synchronizing signal corresponds in response to the reset pulse from the reset pulse generator, the vertical drive pulse generator according to the present invention further comprises a circuit for deciding to which broadcasting system the cycle of the reset pulse from the reset pulse generator corresponds, and a step-out detection circuit for deciding whether or not the reset pulse from the reset pulse generator is generated in a cycle corresponding to a predetermined vertical cycle specific to a broadcasting system thereby to decide whether or not the counting operation of the counter circuit is synchronized with the externally incoming vertical synchronizing signal. The input selection circuit passes one of the input signals in response to the output from the broadcasting system decision circuit and the output of the step-out detection circuit and supplies the same to the reset pulse generator. The control signal generation circuit selectively passes one of the control signals from the counter circuit in response to the outputs from the broadcasting system decision circuit and the step-out detection circuit and supplies the same to the gate circuit.

Preferably a pair of wide and narrow gate periods are set for each broadcasting system.

According to the aforementioned structure, specific gate periods are provided for the vertical synchronizing signals of the respective broadcasting systems. Thus, influence of noise caused in the signals of the respective broadcasting systems can be minimized.

Further, the gate periods for the first and second broadcasting systems partially overlap with each other. Thus, the broadcasting system of an incoming vertical synchronizing signal can be reliably decided when the vertical synchronizing signal alternately arrives before and after a discrimination critical point between the broadcasting systems in a special reproduction mode of a VCR, for example, whereby the vertical counter circuit can reliably maintain a synchronous state for the externally incoming vertical synchronizing signal.

If the counting operation of the counter circuit is not synchronous with the cycle of the incoming vertical synchronizing signal, the gate period is widely set to correspond to both of the broadcasting systems, whereby a synchronization pull-in speed can be increased.

Further, the gate period selected in correspondence to the broadcasting system is switched to a narrow second gate period when synchronization with the external vertical synchronizing signal is attained. Thus, influence by noise caused in the signal of each broadcasting system can be extremely reduced.

When a narrow gate period is set, the counting operation of the counter is reset by a control signal generated by the counter itself, so that the vertical drive pulse can be reliably generated in a stable cycle once a synchronous state is attained, even if the synchronizing signal is slightly varied in phase.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 illustrates exemplary structure of a conventional vertical drive pulse generator of a countdown system;

FIG. 4 is a waveform diagram showing operation of a vertical countdown circuit for receiving a video signal of the NTSC system;

FIG. 5 illustrates operation of the vertical drive pulse generator for receiving a video signal of the PAL system;

FIG. 6 illustrates gate periods of a gate circuit shown in FIG. 3;

FIG. 21 schematically illustrates structure of a gate circuit shown in FIG. 20.

DESCRIPTION OF THE PREFERRED EMBODIMENTS

Figure 1:
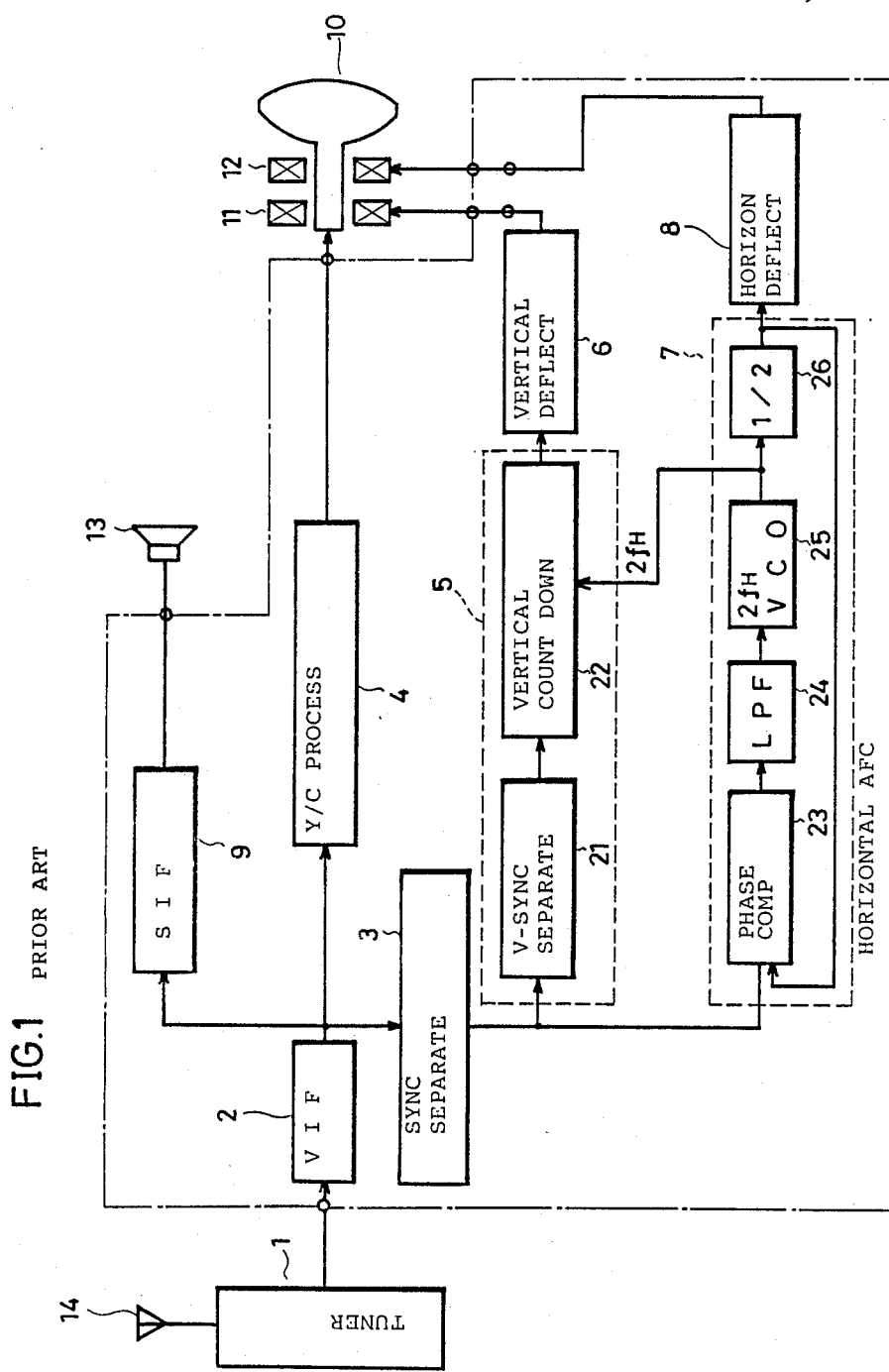
FIG. 1 schematically illustrates overall structure of a television receiver to which the present invention is applied.
Figure 3:
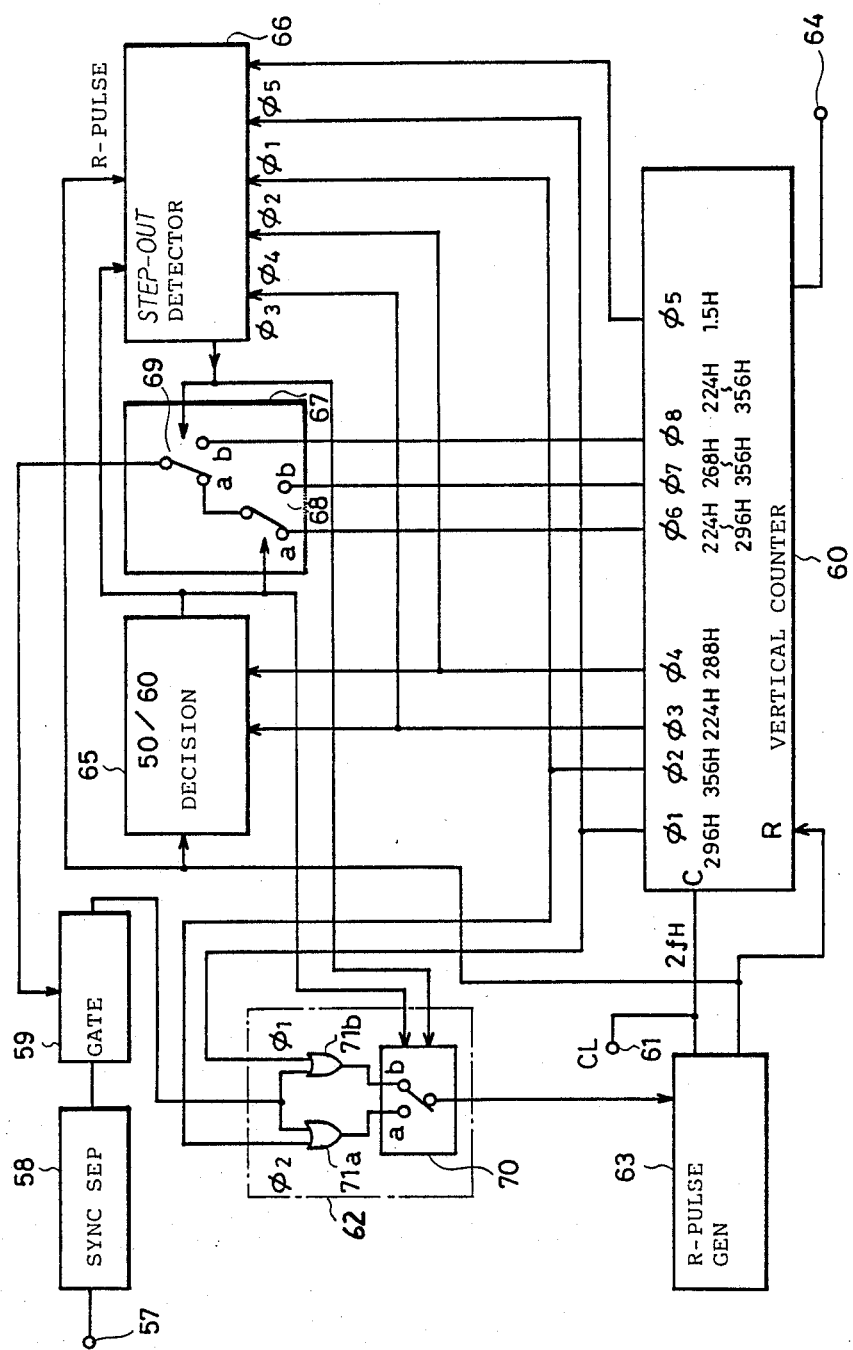
FIG. 3 schematically illustrates overall structure of a vertical drive pulse generator according to an embodiment of the present invention.

FIG. 3 schematically illustrates the structure of a vertical drive pulse generator according to an embodiment of the present invention. Referring to FIG. 3, the vertical drive pulse generator includes an input terminal 57 which receives a composite video signal of the NTSC or PAL system, a vertical sync separation circuit 58 which separates a vertical synchronizing signal from the composite video signal received from the input terminal 57, a gate circuit 59 which passes the vertical synchronizing signal separated by the vertical sync separation circuit 58, and a vertical countdown counter circuit 60 which counts a clock signal of a frequency 2 $f_H$ ($f_H$: frequency of a horizontal synchronizing signal) supplied from a clock input terminal 61 for outputting first to eighth control signals $\phi 1$ to $\phi 8$ and generates a vertical drive pulse at an output terminal 64 in response to a reset pulse from a reset pulse generator 63.

The gate circuit 59 is electrically opened for a prescribed period in response to a control signal from a gate signal selection circuit 67, and passes the signal from the vertical sync separation circuit 58 to supply the same to the input selection circuit 62.

The input selection circuit 62 receives the signal from the gate circuit 59 and the first and second control signals $\phi 1$ and $\phi 2$ from the vertical countdown counter circuit 60. In response to a decision signal from a 50/60 decision circuit 65 and a detection signal from a step-out detection circuit 66, the input selection circuit 62 selectively passes one of the received three signals and supplies the same to the reset pulse generator 63. This input selection circuit 62 includes first and second OR gates 71a and 71b and a switching circuit 70. The first OR gate 71a receives the signal from the gate circuit 59 and the second control signal $\phi 2$ from the vertical countdown counter circuit 60. The second OR gate 71b receives the signal from the gate circuit 59 and the first control signal $\phi 1$ from the vertical countdown counter circuit 60. In response to the decision signal from the 50/60 decision circuit 65 and the detection signal from the step-out detection circuit 66, the switching circuit 70 selects the output from either the first OR gate 71a or the second OR gate 71b, and supplies the same to the reset pulse generator 63. While the specific structure of the input selection circuit 62 is hereinafter described in detail, while the same is conceptually shown in FIG. 3 in the form of the switching component and the OR gates, simply in order to functionally and schematically illustrate its operation.

The 50/60 decision circuit 65 starts operation in response to the third control signal $\phi 3$ from the vertical countdown counter circuit 60 to compare the phase of the reset pulse received from the reset pulse generator 63 with that of the fourth control signal $\phi 4$ received from the vertical countdown counter circuit 60 and decides whether the incoming vertical synchronizing signal is of 50 Hz or 60 Hz, to output a signal of a level in accordance with the result of the decision.

A gate signal selection circuit 67 includes first and second switching circuits 68 and 69. The first switching circuit 68 receives the sixth and seventh control signals $\phi 6$ and $\phi 7$ from the vertical countdown counter circuit 60, and selectively passes either signal in response to the decision signal from the 50/60 decision circuit 65. The second switching circuit 69 receives the output from the first switching circuit 68 and the eighth control signal $\phi 8$ from the vertical countdown counter circuit 60, and selects either signal in response to the detection signal from the step-out detection circuit 66 to supply the same to the gate circuit 59. The output from the gate signal selection circuit 67 sets a period for opening the gate circuit 59, to enable signal passage.

The first and second switching circuits 68 and 69 are in practice formed through logic gates, while the same are shown in the form of switching elements in FIG. 3, in order to functionally illustrate operation thereof.

The step-out detection circuit 66 detects whether or not the vertical countdown counter circuit 60 is in a step-out state, in which its counting operation is asynchronous with the arriving vertical synchronizing signal, in response to the first to fifth control signals $\phi 1$ to $\phi 5$ from the vertical countdown counter circuit 60, the reset pulse from the reset pulse generator 63 and the decision signal from the 50/60 decision circuit 65.

The reset pulse generator 63 generates a reset pulse having pulse width for one cycle of a clock signal CL supplied from the input terminal 61 in response to the signal from the input selection circuit 62.

The vertical countdown counter circuit 60 includes cascade-connected T-type flip-flops (hereinafter referred to as T-FFs) of 10 stages and a decoder circuit for deriving a desired control signal from the outputs of the T-FFs. The T-FFs frequency-divide the clock signal of the frequency $2 f_H$ applied from the clock input terminal 61. This counter circuit 60 has circuit structure which is analogous to that shown in FIG. 3 of EPC application No. 0249987A2 filed in the name of the assignee, for example, and the decoder circuit includes an RS flip-flop and an AND gate, for example. The first control signal $\phi 1$ becomes active when the count value of the vertical countdown counter circuit 60 reaches 296 H (H: one horizontal scanning period). The second control signal $\phi 2$ similarly becomes active when the count value reaches 356 H. The third control signal $\phi 3$ becomes active at 224 H. The fourth control signal $\phi 4$ becomes active at 288 H. The fifth control signal $\phi 5$ becomes active at 1.5 H. The sixth control signal $\phi 6$ becomes active during a period of 224 H to 296 H. The seventh control signal $\phi 7$ becomes active during a period of 268 H to 356 H. The eighth control signal $\phi 8$ becomes active during a period of 224 H to 356 H. The vertical countdown counter circuit 60 is reset in response to the reset pulse from the reset pulse generator 63 and generates a high-level signal (vertical drive pulse) for a 8.5 H to supply the same to the output terminal 64.

The cycle of a vertical synchronizing signal included in a composite video signal transmitted from a broadcasting station is 262.5 H in the NTSC system, while the cycle of such a vertical synchronizing signal is 312.5 H in the PAL system. According to this embodiment, the gate period for opening the gate circuit 59 is set in a range of 224 H to 296 H for the NTSC system, while the gate period is set in a range of 268 H to 356 H for the PAL system.

Timing (discrimination critical point) forming the basis of the decision in the 50/60 decision circuit 65 as to the NTSC and PAL systems is set at 288 H (defined by the signal $\phi 4$). Operation is now described.

When no video signal is applied to the input terminal 57, the vertical countdown counter circuit 60 sequentially counts the clock signal CL of the frequency $2 f_H$ supplied from the clock terminal 61. When this count reaches 256 H, the vertical countdown counter circuit 60 generates the second control signal $\phi 2$ (356 H) and applies the same to the step-out detection circuit 66. In response to the second control signal $\phi 2$, the step-out detection circuit 66 generates a low-level output signal indicating a step-out state of the vertical countdown counter circuit 60, and supplies the same to the switching circuit 70 included in the input selection circuit 62. The switching circuit 70 selects a contact a contrarily to the state shown in FIG. 3, thereby to select the output of the first OR gate 71*a*. Thus, the second control signal $\phi 2$ from the vertical countdown counter circuit 60 is supplied to the reset pulse generator 63 through the first-OR gate 71*a* and the switching circuit 70. The reset pulse generator 63 generates a reset pulse in response to the signal received from the input selection circuit 62. Since the pulse width of the reset pulse from the reset pulse generator 63 is defined at a small value (one cycle of the clock signal having the frequency $2 f_H$) in response to the clock signal CL of the frequency $2 f_H$ supplied from the clock input terminal 61, the vertical countdown counter circuit 60 re-starts counting operation immediately after the same is reset by the reset pulse. This operation is so repeated that the vertical countdown counter 60 re-generates the second control signal $\phi 2$ when its count indicates 356 H, thereby to repeat operation similar to the above. In this state, the vertical countdown counter circuit 60 is supplied with no external reset timing signal, and performs "self-reset operation" of repeating resetting in response to the reset signal $\phi 2$ generated by the counter 60 itself.

In the following description, the state in which the vertical countdown counter circuit 60 performs the "self-reset" operation is referred to as a "step-out state" and other estate is referred to as a "synchronous state".

On the other hand, the switching circuit 69 included in the gate signal selection circuit 67 switches its contact to be contrarily to the state shown in FIG. 3, in response to the low-level signal, indicating the step-out state, received from the step-out detection circuit 66. In response to this, the gate signal selection circuit 67 selects the eight control signal $\phi 8$ received from the vertical countdown counter circuit 60 and supplies the same to the gate circuit 59. As hereinabove described, the eighth control signal $\phi 8$ becomes active for the period of 224 H to 356 H. Consequently, the gate circuit 59 has a wide gate period of 224 H to 356 H, and passes the signal supplied from the sync separation circuit 58 in this period.

It is assumed that a video signal of the NTSC or PAL system is supplied to the input terminal 57 in this self-reset state. A vertical synchronizing signal included in the video signal supplied to the input terminal 57 is separated by the sync separation circuit 58 and applied to the gate circuit 59. The gate circuit 59, having the wide gate period of 224 H to 356 H, passes the vertical synchronizing signal from the sync separation circuit 58 and supplies the same to the input selection circuit 62.

The switching circuit 70 is adapted to be subjected to predominant control by the control signal from the step-out detection circuit 66 regardless of the control signal from the 50/60 decision circuit 65 (a specific structure therefor is hereinafter described in detail). Therefore, the switching circuit 70 selects the first OR gate 71*a*. Consequently, the vertical synchronizing signal received from the gate circuit 59 is supplied to the reset pulse generator 63 through the first OR gate 71*a* and the switching circuit 70. The reset pulse generator 63 generates a reset pulse in response to the vertical synchronizing signal received from the input selection circuit 62, and supplies the same to the vertical countdown counter circuit 60, the 50/60 decision circuit 65 and the step-out detection circuit 66.

The 50/60 decision circuit 65, specific structure of which will be hereinafter described in detail, is enabled to strobe the reset pulse in response to the third control signal $\phi 3$ (224 H) from the vertical countdown counter circuit 60, and compares the phases of the reset pulse and the fourth control signal $\phi 4$ (288 H) from the counter circuit 60. The 50/60 decision circuit 65 further counts the output indicating the result of such phase comparison up to a prescribed value (counting of four times, for example) through a counter, and thereafter generates a signal indicating the result of the 50/60 decision.

When the 50/60 decision circuit 65 supplies a high-level output signal indicating that the vertical synchronizing signal is of 60 Hz, the step-out detection circuit 66, the specific structure of which will be hereinafter described in detail, is enabled to incorporate the reset pulse thereafter received in response to the third control signal $\phi 3$ from the counter circuit 60, and counts the reset pulse by a prescribed number of times through a counter to thereafter generate a high-level output signal indicating a synchronous state. When no reset pulse is received, the step-out detection circuit 66 generates a low-level signal indicating a step-out state in response to the first control signal $\phi 1$ (296 H) from the counter circuit 60.

When a low-level output signal indicating that the vertical synchronizing signal is of 50 Hz is applied from the 50/60 decision circuit 65, the step-out detection circuit 66 becomes capable of incorporating the reset pulse thereafter received in response to the fourth control signal $\phi 4$ from the counter circuit 60, and counts the reset pulse by a prescribed number of times through a counter to generate a high-level output signal indicating a synchronous state. If no reset pulse arrives when the low-level signal is supplied from the 50/60 decision circuit 65, the step-out detection circuit 66 generates a low-level output signal indicating a step-out state in response to the second control signal $\phi 2$ from the vertical countdown counter circuit 60.

Consider that a vertical synchronizing signal of the NTSC system is received. In this case, the reset pulse is generated response to the vertical synchronizing signal (cycle: 262.5 H) of the NTSC system, and the 50/60 decision circuit 60 compares the phases of the rest pulse and the fourth control signal $\phi 4$ from the countdown counter circuit 60. Since the reset pulse precedes the fourth control signal $\phi 4$ (288 H) in phase, the 50/60 decision circuit 65 generates a high-level output signal after performing phase comparison by a prescribed number of times and supplies the same to the switching circuit 68 included in the gate signal selection circuit 67. In response to this high-level signal, the switching circuit 68 switches its contact to a, thereby to select the sixth control signal $\phi 6$ from the vertical countdown counter circuit 60 (see FIG. 4(b)).

The high-level output signal from the 50/60 decision circuit 65 is also supplied to the step-out detection circuit 66, which in turn incorporates the reset pulse in response to the third control signal $\phi 3$ from the countdown counter circuit 60, and generates a high-level output signal upon counting the reset pulse by a prescribed number of times, to supply the same to the switching circuit 69 included in the gate signal selection circuit 67. In response to the high-level signal received from the step-out detection circuit 66, the switching circuit 69 switches its contact to a. Consequently, the sixth control signal $\phi 6$ from the countdown counter circuit 60 is supplied to the gate circuit 59 as a gate control signal. Thus, the gate circuit 59 is opened for a period of 224 H to 296 H, during which the control signal $\phi 6$ is active. Under such a condition, the vertical synchronizing signal (negative polarity; see FIG. 4(c)) from the sync separation circuit 58 is supplied to the input selection circuit 62 through the gate circuit 59. The sixth control signal $\phi 6$ becomes active for the period of 224 H to 296 H. However, the count of the vertical countdown counter circuit 60 is reset at the leading edge of a reset pulse signal from the reset pulse generator 63. Therefore, the sixth control signal $\phi 6$ falls at 262 H. Thus, the gate circuit 59 outputs a pulse signal for a short period from supply of the vertical synchronizing signal to the falling edge of the control signal $\phi 6$ (see FIG. 4(d)). The pulsing output signal from the gate circuit 59 is supplied to the reset pulse generator 63 through the input selection circuit 62. The reset pulse generator 63 generates a reset pulse which goes high for a period of 0.5 H at the falling edge of the output signal from the gate circuit 59 (see FIG. 4(e)). The vertical countdown counter circuit 60 derives a signal which goes high for a period of 8.5 H responsively at the rising edge of the reset pulse, and supplies the same to a vertical driving circuit (not shown) as a vertical drive pulse through the output terminal 64.

Due to the aforementioned operation, the gate period is set alternatively from the range of the wide gate period of 224 H to 356 H to the gate period specific to the NTSC system, i.e., the period of 224 H to 296 H when the vertical synchronizing signal of the NTSC system is received, whereby a vertical drive pulse synchronous with the vertical synchronizing signal of the NTSC system can be reliably obtained.

Description is now made on operation performed when a vertical synchronizing signal of the PAL system is received. The vertical synchronizing signal of the PAL system is supplied to the reset pulse generator 63 through the gate circuit 59 and the input selection circuit 62. The reset pulse generator 63 generate a reset pulse in response to the vertical synchronizing signal of the PAL system. Therefore, the reset pulse applied to the 50/60 decision circuit 65 lags the fourth control signal $\phi 4$ (228 H) outputted from the countdown counter circuit 60 in phase, and hence the 50/60 decision circuit 65 generates a low-level output signal indicating 60 Hz to supply the same to the switching circuit 68 of the gate signal selection circuit 67. In response to the low-level output circuit 68 switches its contact to b, thereby to select the seventh control signal $\phi 7$ (268 H to 356 H) from the vertical countdown counter circuit 60.

On the other hand, the step-out detection circuit 66 incorporates the reset pulse after the fourth control signal $\phi 4$ is supplied in response to the low-level output signal from the 50/60 decision circuit 65, counts the same by a prescribed number of times and thereafter generates a high-level output signal to supply the same to the switching circuit 69 in the gate signal selection circuit 67. In response to the high-level signal from the step-out detection circuit 66, the switching circuit 69 switches its contact to a. Thus, the seventh control signal $\phi 7$ is supplied to the gate circuit 59 as a gate control signal. The seventh control signal $\phi 7$ supplied to the gate circuit 59 falls at the leading edge of the reset pulse (FIG. 5(e)) as shown at FIG. 5(b), since the same is generated after the vertical synchronizing signal is counted by a prescribed number of times. When the vertical synchronizing signal (FIG. 5(c)) is supplied in this state, the gate circuit 59 generates a pulse signal (FIG. 5(d)) which goes high for a period between supply of the vertical synchronizing signal and the trailing edge of the seventh control signal $\phi 7$, and supplies the same to the input selection circuit 62. The input selection circuit 62 passes the signal from the gate circuit 59 and supplies the same to the reset pulse generator 63. The reset pulse generator 63 generates a reset pulse in response to the pulse signal, and supplies the same to the vertical countdown counter circuit 60. The vertical countdown counter circuit 60 is reset in response to the reset pulse (FIG. 5(e)) to reset its seventh control signal $\phi 7$, while generating a vertical drive pulse which goes high for a period of 8.5 H at the leading edge of the reset pulse.

Although the reset pulses are generated at 262 H and 312 H in FIGS. 4 and 5, these are mere examples and the pulses may be provided in other timings.

The reset pulse generator 63 is formed by a D-type flip-flop, for example, which incorporates the pulse signal supplied from the gate circuit 59 through the input selection circuit 62 at the falling edge of the clock signal CL. A signal by which the reset pulse goes high for a one-cycle period of the clock signal CL can be outputted by such structure. Therefore, the sixth and seventh control signals $\phi 6$ and $\phi 7$ are regularly reset response to the output from the vertical countdown counter 60 at a time t1 when the reset pulse is generated (see FIGS. 4 and 5).

According to the aforementioned structure, a specific gate period (268 H to 356 H) corresponding to the vertical synchronizing signal of the PAL system can be set along the seventh control signal $\phi 7$, thereby to reliably obtain a vertical drive pulse which is synchronous with the vertical synchronizing signal of the PAL system supplied in this gate period.

As shown in FIG. 6, therefore, it is possible to set the gate period of the gate circuit 59 in the range of 224 H to 296 H for the NTSC system and in the range of 268 H to 356 H for the PAL system as hereinabove described, whereby the respective gate periods can be narrowed in width to improve noise immunity.

Description is now made on operation performed when received signals are switched from a video signal of PAL system broadcasting to that of NTSC system broadcasting. When the PAL system broadcasting signal is received, the gate circuit 59 is opened for the period of 268 H to 356 H in response to the seventh control signal $\phi 7$ from the vertical countdown counter circuit 60. However, the vertical synchronizing signal of the NTSC system, which arrives at 262.5 H, cannot pass through the gate circuit 59. In this case, therefore, the input selection circuit 62 generates no synchronizing signal and the reset pulse generator 63 generates no reset pulse in response to the vertical synchronizing signal. Therefore, the vertical countdown counter circuit 60 is not reset but continues its counting operation. The vertical countdown counter circuit 60 generates the second control signal $\phi 2$ when its count indicates 356 H, and supplies the same to the OR gate 71a of the input selection circuit 62. The second control signal $\phi 2$ received in the OR gate 71a is supplied to the reset pulse generator 63 through the switching circuit 70. The reset pulse generator 63 generates a reset pulse in response to the control signal $\phi 2$, and supplies the same to the vertical countdown counter circuit 60. Consequently, the vertical countdown counter circuit 60 is reset and enters a self-reset state.

On the other hand, the step-out detection circuit 66 generates a low-level signal indicating a step-out state in response to the second control signal $\phi 2$ since no reset pulse is supplied even if the fourth control signal $\phi 4$ (288 H) is received, and supplies the same to the gate signal selection circuit 67. In response to the low-level signal indicating the step-out state from the step-out detection circuit 66, the gate signal selection circuit 67 switches the contact of its switching circuit 69 to b. Thus, the gate circuit 59 is opened for a period of 224 H to 356 H in response to the eighth control signal $\phi 8$ (see FIG. 6).

In this case, the step-out detection circuit 66 switches the contact of the switching circuit 69 to b immediately when the second control circuit $\phi 2$ is supplied.

The switching circuit 70 switches its contact to a, in response to the low-level signal from the step-out detection circuit 66.

Due to the aforementioned operation, the vertical synchronizing signal of the NTSC system can pass through the gate circuit 59 for the second time, and is supplied to the reset pulse generator 63 through the OR gate 71a and the switching circuit 70. The reset pulse generator 63 generates a reset pulse in response to the vertical synchronizing signal of the NTSC system, and resets the vertical countdown counter circuit 60. Thus, it is possible to immediately obtain a vertical drive pulse which is synchronous with the vertical synchronizing signal of the NTSC system from the output terminal 64.

The 50/60 decision circuit 65 compares the phases of the reset pulse and the fourth control signal $\phi 4$ by a prescribed number of times before deciding whether the field frequency is 50 Hz or 60 Hz, thereby to decide whether the supplied synchronizing signal is of the NTSC system or the PAL system on the basis of the result of such phase comparison. If no step-out detection circuit 66 is provided, therefore, no switching from the PAL system to the NTSC system is made until the result of the decision is derived (for four vertical periods, for example), and hence no vertical synchronization can be obtained and the television picture is caused to flow. However, since the step-out detection circuit 66 is provided according to the present invention as hereinabove described, the gate period is immediately extended under control by the step-out detection circuit 66 when a step-out state is caused and no reset pulse is generated, whereby synchronization pull-in operation can be quickly performed to reproduce a stable picture.

In addition to the vertical synchronizing signal of television broadcasting, a vertical synchronizing signal reproduced from a VCR (video cassette recorder), for example, may be supplied to the input terminal 57 shown in FIG. 3. The cycle of the vertical synchronizing signal reproduced from the VCR is instabilized in specific reproduction mode such as double-speed reproduction or still picture reproduction, such that the vertical synchronizing signal is varied around 288 H, which is the discrimination critical point between the NTSC and PAL systems, for example, to be repeatedly positioned at points A and B alternately every vertical period. In other words, a 1 H period is precisely set in specific reproduction of a general VCR and no variation is caused in $f_H$, while the vertical synchronizing signal is varied.

When the gate period for the NTSC system is set in the range of 224 H to 288 H and that for the PAL system is set in the range of 288 H to 356 H in a non-overlapping manner, vertical synchronization cannot be attained every vertical period in such a case. For example, it is assumed that the PAL system is first detected and the gate period for opening the gate circuit 59 is in the range of 288 H to 356 H. In this state, a vertical synchronizing signal supplied at a timing preceding 288 H cannot pass through the gate circuit 59 since this signal is out of the gate period. Thus, the vertical countdown counter circuit 60 is not reset in response to the vertical synchronizing signal but reset at 356 H, whereby the television picture flows in that instant.

When a detection of the NTSC system is made and the gate period is set in the range of 224 H to 288 H, on the other hand, a vertical synchronizing signal supplied at a timing following 288 H is out of the gate period and the vertical countdown counter circuit 60 is not reset in response to this vertical synchronizing signal but reset at 356 H, whereby the picture is caused to flow.

In order to solve such a problem, according to the present invention, the gate period for the NTSC system overlaps with that for the PAL system in the vicinity of the discrimination critical point (288 H), as shown in FIG. 6. Due to such structure, the vertical countdown counter circuit 60 can maintain a synchronous state even in the aforementioned case, thereby to prevent vertical flow of the television picture. Exemplary structure of each circuit shown in FIG. 3 is now described.

Figure 7:
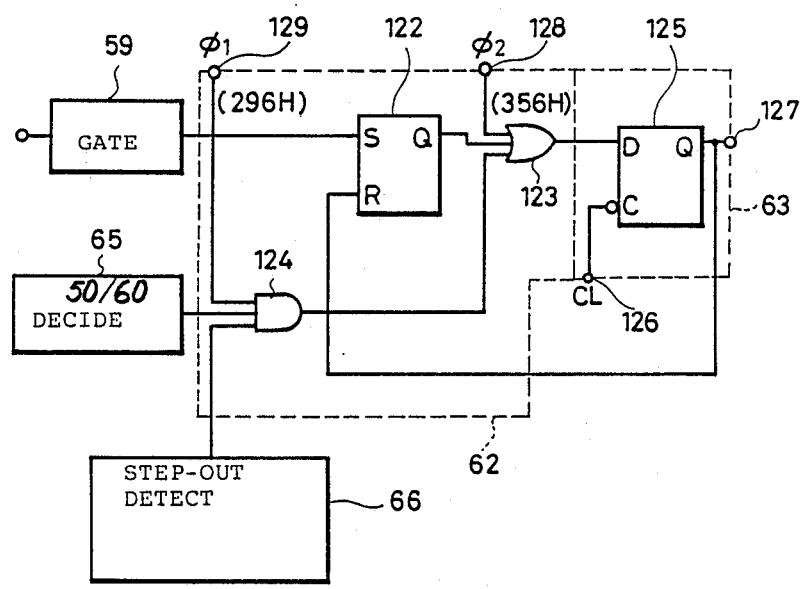
FIG. 7 is a block diagram showing exemplary structure of an input selection circuit and a reset pulse generator shown in FIG. 3.

FIG. 7 shows specific structure of the input selection circuit 62 and the reset pulse generator 63. Referring to FIG. 7, the input selection circuit 62 includes a three-input AND gate 124, a set/reset flip-flop (RS-FF) 122 and a three-input OR gate 123. The AND gate 124 receives the first control signal $\phi 1$ supplied through an input terminal 129, the decision signal from the 50/60 decision circuit 65 and the detection signal from the step-out detection circuit 66. The RS-FF 122 has a set input S for receiving an output from the gate circuit 59, a reset input R for receiving an output from the reset pulse generator 63 and a Q output terminal. The OR gate 123 receives the second control signal $\phi 2$ supplied through an input terminal 128, the Q output from the RS-FF 122 and the output of the AND gate 124.

The reset pulse generator 63 is formed by a D-type flip-flop (D-FF) 125, which has a D input for receiving the output of the input selection circuit 62 (output of the OR gate 123), a clock input C for receiving the clock signal CL supplied through an input terminal 126 and a Q output terminal. The Q output of the D-FF 125 is outputted from an output terminal 127 as the reset pulse. Operation is now briefly described.

Consider that a vertical synchronizing signal of either the NTSC system or the PAL system is received. In this case, the vertical synchronizing signal is supplied to the set input S of the RS-FF 122 through the gate circuit 59, to set the RS-FF 122. Consequently, the Q output of the RS-FF 122 goes high and is supplied to the OR gate 123. The OR gate 123 outputs a high-level signal when one of its inputs goes high, and supplies the same to the D input of the D-FF 125. The clock signal CL is applied to the clock input C of the D-FF 125 from the input terminal 126. At the falling edge of the clock signal CL, the D-FF 125 incorporates and latches the signal received at its D input and outputs the same from its Q output as well. Therefore, when the output of the OR gate 123 goes high, the output Q of the D-FF 125 goes high on the next falling edge of the clock signal CL, to output a reset pulse. The output of the D-FF 125 is further supplied to the reset input R of the RS-FF 122. Therefore, the Q output of the RS-FF 122 goes low upon supply of the reset pulse from the D-FF 125, and the output of the OR gate 123 also goes low. Consequently, the Q output of the D-FF 125 goes low at the falling edge of a next clock signal after generation of the reset pulse.

Due to such structure, the output terminal 127 outputs a reset pulse having a fixed width corresponding to one cycle of the clock signal CL.

In a step-out state, the step-out detection circuit 66 outputs a low-level signal. Thus, the AND gate 124 is disabled and outputs a low-level signal regardless of the levels of the control signal $\phi 1$ and the output 50/60 decision circuit 65. Consequently, the OR gate 123 outputs an output signal level which is responsive to the output of the RS-FF 122 or the second control signal $\phi 2$. Thus, the reset pulse is generated in response to the control signal $\phi 2$ in a self-reset state. When a synchronizing signal is supplied from the gate circuit 59, on the other hand, a reset pulse responsive to the supplied synchronizing signal is generated.

Consider that a vertical synchronizing signal of the NTSC system to be received is dropped out. At this time, the 50/60 decision circuit 65 outputs a high-level signal indicating 60 Hz and the step-out detection circuit 66 still outputs a high-level signal indicating a synchronous state. Therefore, the control signal $\phi 1$ is supplied to the OR gate 123 through the AND gate 124, and a reset pulse is generated in response to the control signal $\phi 1$.

When a vertical synchronizing signal of the PAL system to be received is dropped out, the AND gate 124 is in a disabled state since the 50/60 decision circuit 65 generates a low-level output signal indicating 50 Hz. In this case, therefore, the second control signal $\phi 2$ is supplied to the D-FF 125 (reset pulse generator 63) through the OR gate 123, and a reset pulse is generated in response to the second control signal $\phi 2$.

Although the input selection circuit 62 is somewhat different in structure from that shown in FIG. 3, the former is absolutely identical in operation to the latter, and the structure of FIG. 3 is merely conceptually illustrated in order to simplify its operation.

Figure 8:
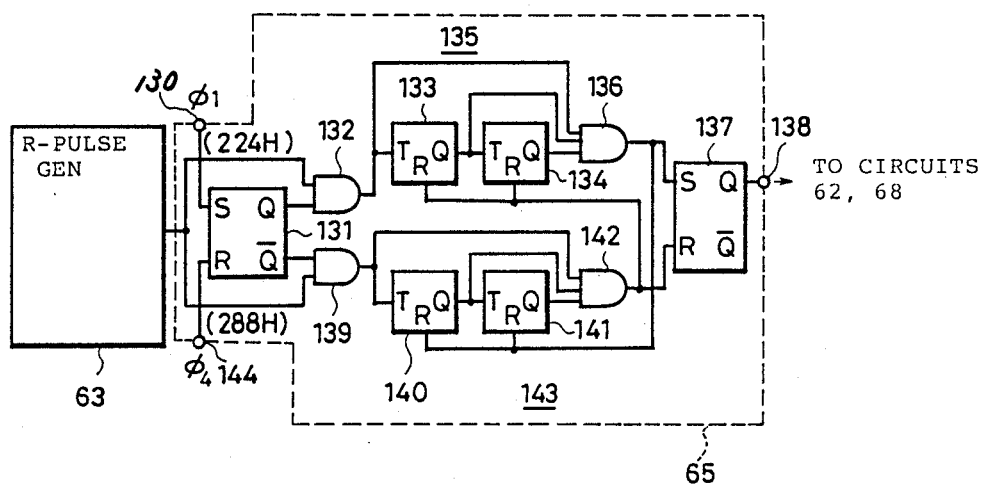
FIG. 8 is a block diagram showing exemplary structure of a 50/60 decision circuit for deciding a broadcasting system shown in FIG. 3.

FIG. 8 shows exemplary structure of the 50/60 decision circuit 65. Referring to FIG. 8, the 50/60 decision circuit 65 includes a part for performing phase comparison of the reset pulse, a part for counting the result of such phase comparison and a part for outputting the result of decision in response to the counter part.

The phase comparison part includes an RS-FF 131 and two AND gates 132 and 139. The RS-FF 131 has a set input S for receiving the third control signal $\phi 3$ supplied through an input terminal 130, a reset input R for receiving the fourth control signal $\phi 4$ supplied through an input terminal 144, a Q output and a $\overline{Q}$ output. The AND gate 132 receives the reset pulse from the reset pulse generator 63 and the Q output of the RS-FF 131. The AND gate 139 receives the $\overline{Q}$ output of the RS-FF 131 and the reset pulse from the reset pulse generator 63.

The part for counting the result of phase comparison includes two counters 135 and 143. The counter 135 is adapted to decide whether or not a vertical synchronizing signal of the NTSC system is supplied, and includes two T-type flip-flops (T-FFs) 133 and 134 and an AND gate 136. The T-FF 133 has a T input for receiving the output of the AND gate 132 and a Q output. The T-FF 134 has a T input for receiving the Q output of the T-FF 133 and a Q output. The AND gate 136 receives the output of the AND gate 132 and the outputs of the T-FFs 133 and 134.

The counter circuit part 143, which is adapted to detect that the supplied vertical synchronizing signal is of the PAL system, also includes two cascade-connected T-FFs 140 and 141 and an AND gate 142. The T-FF 140 has a T input for receiving the output of the AND gate 139 and a Q output. The T-FF 141 has a T input for receiving the Q output of the T-FF 140 and a Q output. The AND gate 142 receives the output of the AND gate 139, the Q output of the T-FF 140 and the Q output of the T-FF 141.

The circuit part representing the result of decision is formed by an RS-FF 137, which has a set input S for receiving the output of the AND gate 136, a reset input R for receiving the output of the AND gate 142, a Q output and a $\overline{Q}$ output. The Q output of the RS-FF 137 is outputted through an output terminal 138, to indicate whether the supplied vertical synchronizing signal is of the NTSC system or the PAL system. Operation is now described.

It is assumed that a vertical synchronizing signal of the NTSC system is received. In this case, the RS-FF 131 is set in response to the third control signal $\phi 3$ supplied from the input terminal 130, and the Q output thereof goes high. Consequently, the AND gate 132 is enabled to pass the reset pulse from the reset pulse generator 65. The counter 135, which comprises T-FFs 133 and 134 of two stages to form a quartery counter, counts a pulse signal from the AND gate 132 four times. After successive counting of the pulse signal by four times, the T-FF 134 outputs a high-level signal from its Q output and supplies the same to the AND gate 136. Thus, when the pulse signal from the AND gate 132 is received four times, the output of the AND gate 136 goes high to set the RS-FF 137 to setting its Q output at a high level. Consequently, the output terminal 138 outputs a high-level signal indicating that a video signal of the NTSC system is received.

When a vertical synchronizing signal of the PAL system is received, the reset pulse generator 63 supplies a reset pulse at a timing following 288 H. When the RS-FF 131 is in a set state, therefore, no such reset pulse is applied. Therefore, the output of the AND gate 132 is normally at a low level. On the other hand, the RS-FF 131 is reset in response to the fourth control signal $\phi 4$, and its $\overline{Q}$ output goes high. When the reset pulse generator 63 supplies the reset pulse in this state, the output of the AND gate 139 goes high. The counter circuit 143 counts this output of the AND gate 139. When the output of the AND gate 139 goes high four times, the output of the AND gate 142 goes high to reset the RS-FF 137 for setting its $\overline{Q}$ output at a high level, similarly to the above. Consequently, the Q output of the RS-FF 137 outputted through the output terminal 138 goes low to indicate that the received vertical synchronizing signal is of the PAL system.

Figure 9:
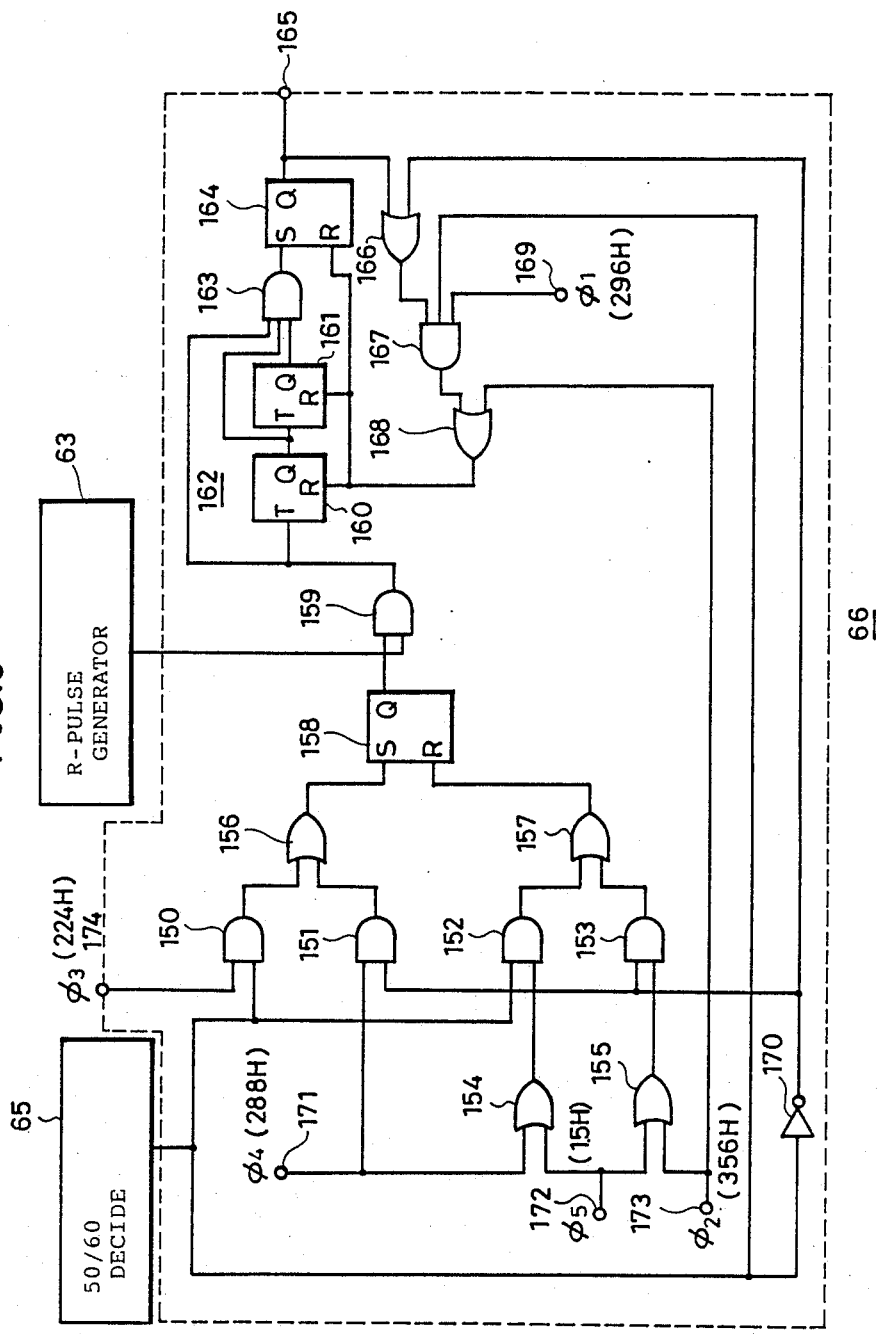
FIG. 9 is a logic diagram showing exemplary structure of a step-out detection circuit shown in FIG. 3.

FIG. 9 shows an exemplary structure of the step-out detection circuit 66 shown in FIG. 3. Referring to FIG. 9, the step-out detection circuit 66 comprises a circuit part for generating phase information and another circuit part for detecting whether or not the phase from the phase information circuit part is mismatched with the reset pulse.

The phase information detection circuit part includes OR gates 154, 155, 156 and 157, AND gates 150, 151, 152 and 153 and an RS-FF 158. The OR gate 154 receives the fourth control signal $\phi 4$ supplied supplied through an input terminal 171 and the fifth control signal $\phi 5$ supplied through another input terminal 172, and supplies the same to a first input of the AND gate 152. The OR gate 155 receives the fifth control signal $\phi 5$ and the second control signal $\phi 2$, and supplies its output to a first input of the AND gate 153. The AND gate 150 receives the third control signal $\phi 3$ supplied through an input terminal 174 and the decision output from the 50/60 decision circuit 65, and supplies its output to a first input of the OR gate 156. The AND gate 151 receives the fourth control signal $\phi 4$ and the result of decision from the 50/60 decision circuit 65 through an inverter 170, and supplies its output to a second input of the OR gate 156. The AND gate 152 receives the decision result output from the 50/60 decision circuit 65 and the output of the OR gate 154, and supplies its output to a first input of the OR gate 157. The AND gate 153 receives the outputs of the inverter 170 and the OR gate 155, and supplies its output to a second input of the OR gate 157. The OR gate 156 receives the outputs of the AND gates 150 and 151, and supplies its output to an S input of an RS flip-flop (RS-FF) 158. The OR gate 157 receives the outputs of the AND gates 152 and 153, and supplies its output to a reset input R of the RS-FF 158. The RS-FF 158 is set in response to the output of the OR gate 156 and reset by the output of the OR gate 157, and supplies its Q output to a first input of an AND gate 159.

The circuit part for detecting a step-out phenomenon includes the AND gate 159 for receiving the reset pulse from the reset pulse generator 63 and the Q output of the RS-FF 158, a counter circuit 162 formed by cascade-connected T-FFs 160 and 161 of two stages for counting the output of the AND gate 159 and a three-input AND gate 163 for receiving the outputs of the AND gate 159 and the T-FFs 160 and 161. The output of the AND gate 163 is supplied to a set input S of an RS-FF 164.

An OR gate 166 for receiving the outputs of the RS-FF 164 and the inverter 170, an AND gate 167 for receiving the outputs of the OR gate 166 and the 50/60 decision circuit 65 and the first control signal $\phi 1$ supplied through a input terminal 169, and an OR gate 168 for receiving the output of the AND gate 167 and the second control signal $\phi 2$ supplied through an input terminal 173 are provided in order to supply reset timing for the T-FFs 160 and 161 and the RS-FF 164. The output of the OR gate 168 is supplied to reset inputs R of the flip-flops 160, 161 and 164. The RS-FF 164 generates a signal indicating occurrence/non-occurrence of a step-out phenomenon through an output terminal 165. Operation is now described.

It is assumed that a vertical synchronizing signal of the NTSC system is received. In this case, the 50/60 decision circuit 65 outputs a high-level signal. Thus, the AND gates 150 and 152 are enabled and the AND gates 151 and 153 are disabled. The AND gate 150 passes the third control signal $\phi 3$, and sets the RS-FF 158 through the OR gate 155. On the other hand, the AND gate 152 passes the output of the OR gate 154 and resets the RS-FF 158 through the OR gate 157. The OR gate 154 passes the fourth and fifth control signals $\phi 4$ and $\phi 5$. Thus, the RS-FF 158 receiving the vertical synchronizing signal of the NTSC system is set for a period of 224 H to 288 H or 224 H to 1.5 H, so that its Q output goes high for that period. The AND gate 159 passes the reset pulse from the reset pulse generator 63 while the Q output of the RS-FF 158 is at a high level. The output of the AND gate 159 is supplied to the counter circuit 162. The counter circuit 162 counts the output signal from the AND gate 159 four times, and outputs a high-level signal. Consequently, the output of the AND gate 163 goes high when the output signal of the AND gate 159 goes high for the fourth time to set the RS-FF 164, and outputs a high-level signal from its Q output. Thus, the output terminal 165 outputs a high-level signal indicating a synchronous state. The counter circuit 162 and the RS-FF 164 are reset by the AND gates 167 and 168 in response to the control signal $\phi 1$ or $\phi 2$.

Consider that the vertical synchronizing signal is dropped out in this state. In this case, the control signal $\phi 1$ is applied to the AND gate 167 at a timing of 296 H while the reset pulse generator 63 generates no reset pulse. Since both of remaining two inputs of the AND gate 167 are at high levels, the first control signal $\phi 1$ resets the respective flip-flops 10, 161 and 164 through the OR gate 168. Consequently, the RS-FF 164 is reset and its Q output goes low. The signal from the output terminal 165 is applied to the gate signal selection circuit 67, thereby to extend the gate period of the gate circuit 59.

Description is now made on a state of receiving a vertical synchronizing signal of the PAL system. In this case, the output of the 50/60 decision circuit 65 is at a low level. Thus, the AND gates 150 and 152 are disabled while the AND gates 151 and 153 are enabled. The enabled AND gate 151 passes the fourth control signal $\phi 4$, and sets the RS-FF 158 through the OR gate 156. On the other hand, the AND gate 153 passes the output of the OR gate 155, and resets the RS-FF 158 through the OR gate 157. The OR gate 155 passes the fifth control signal $\phi 5$ and the second control signal $\phi 2$, and supplies the same to the AND gate 153. Therefore, the RS-FF 158 is set for a period of 288 H (fourth control signal $\phi 4$) to 356 H (second control signal $\phi 2$) or 288 H to 1.5 H (fifth control signal $\phi 5$), and outputs a high-level signal from its Q output. Consequently, the AND gate 159 passes the reset pulse from the reset pulse generator 63 while the RS-FF 158 is in a set state, similarly to the above. Operation thereafter performed is similar to the above, such that the RS-FF 164 is set when the counter circuit 162 counts the pulse signal four times and a high-level signal indicating a synchronous state is outputted from the output terminal It is assumed that the vertical synchronizing signal is dropped out in this state. In this case, the second control signal $\phi 2$ from the input terminal 60 is supplied to the OR gate 168, and hence the respective flip-flops 160, 161 and 164 are reset through the OR gate 168. Consequently, the Q output of the RS-FF 164 is immediately reset in response to the second control signal $\phi 2$, and outputs a low-level signal indicating a step-out state. Thus, the gate period of the gate circuit 59 is extended.

In this case, the AND gate 167 is in a disabled state since a low-level signal indicating the PAL system is supplied thereto from the 50/60 decision circuit 65, and hence its output is at a low level.

Figure 10:
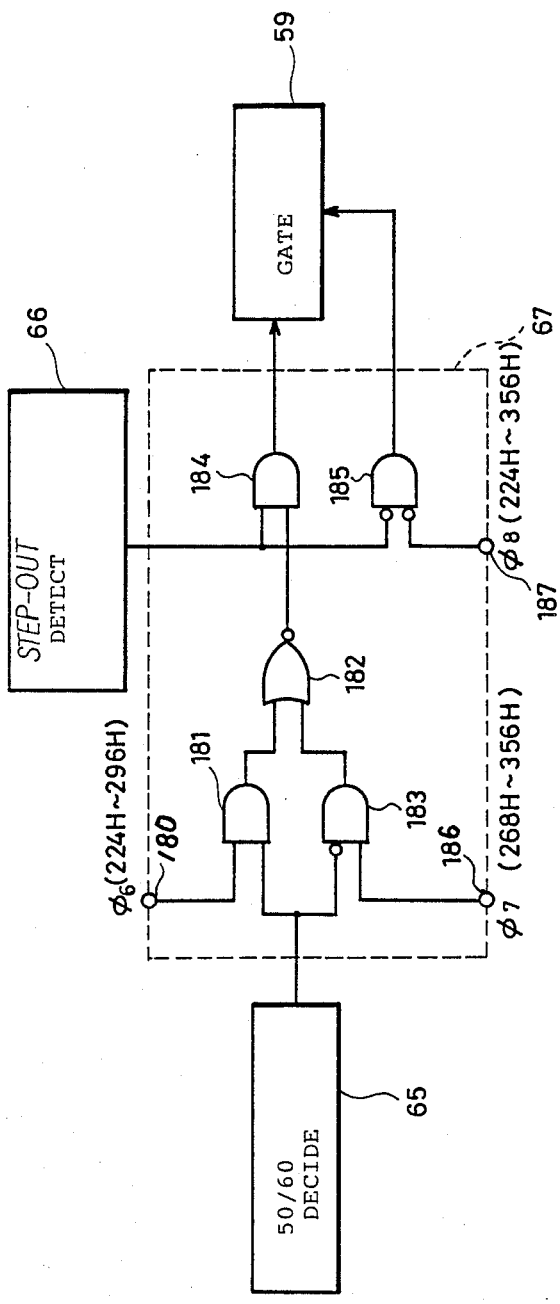
FIG. 10 is a logic diagram showing structure of a gate control signal selection circuit shown in FIG. 3.

FIG. 10 shows an exemplary structure of the gate signal selection circuit 67 shown in FIG. 3. Referring to FIG. 10, a part corresponding to the switching circuit 68 includes an AND gate 183 and a NOR gate 182. An AND gate 181 receives the sixth control signal $\phi 6$ at its first input through an input terminal 180 while receiving the decision result signal from the 50/60 decision circuit 65 at its second input. The AND gate 183 receives the decision result signal from the 50/60 decision circuit 65 at its false input while receiving the seventh control signal $\phi 7$ at its another input through an input terminal 186. The NOR gate 182 receives the outputs from the AND gates 181 and 183. A part corresponding to the switching circuit 69 is formed by an AND gate 184 and a NAND gate 185. The AND gate 184 receives the output of the NOR gate 182 and the output of the step-out detection circuit 66. The NAND gate 185 receives the output of the step-out detection circuit 66 and the eighth control signal $\phi 8$. Either the output of the AND gate 184 or that of the NAND gate 185 is supplied as a control signal for setting the gate period of the gate circuit 59. Operation is now briefly described.

Consider that the output of the 50/60 decision circuit 65 is at a high level to indicate that a synchronizing signal of the NTSC system is received while the step-out detection circuit 66 generates a high-level output signal to indicate a synchronous state. At this time, the control signal $\phi 6$ received from the input terminal 180 is supplied to a first terminal of the NOR gate 182 through the AND gate 181. The output of the AND gate 183 is at a low level since the output of the 50/60 decision circuit 60 is at a high level. Thus, the NOR gate 182 inverts the control signal $\phi 6$ from the AND gate 181 and outputs the inverted signal to supply the same to the AND gate 184. In response to the high-level signal from the step-out detection circuit 66, the AND gate 184 passes the supplied control signal $\phi 6$ (in an inverted state, to be exact) and supplies the same to the gate circuit 59. At this time, the NAND gate 185 outputs a low-level signal regardless of the level of the control signal $\phi 8$, since its first input is at a high level. Thus the gate circuit 59 is opened for a gate period (224 H to 296 H) defined by the control signal $\phi 6$ from the AND gate 184.

Consider that the 50/60 decision circuit 65 outputs a low-level signal to indicate that a synchronizing signal of the PAL system is received and the step-out detection circuit 66 generates a high-level output signal to indicate a synchronous state. In this case, the seventh control signal $\phi 7$ received from the input terminal 186 is supplied to the NOR gate 182 through the AND gate 183, and further supplied to the gate circuit 59 through the AND gate 184. Thus, the gate circuit 59 is made open in the gate period of .268 H to 356 H, which is defined by the control signal $\phi 7$.

On the other hand, when the step-out detection circuit 66 detects a step-out state and outputs a low-level signal, the AND gate 184 is disabled and the NAND gate 185 is enabled. Thus, the NAND gate 185 supplies an output control signal obtained by inverting the control signal $\phi 8$ to the gate circuit 59, to define the gate period of the gate circuit 59.

While each control signal for the gate circuit 59 is supplied in an inverted state in the aforementioned structure, the logic of this operation can be sufficiently satisfied when the gate circuit 59 is formed, for example, by a NOR gate which receives the two outputs of the gate signal selection circuit 67 and an AND gate which receives the output of the sync separation circuit 58 in its second input.

In the aforementioned embodiment, specific gate periods are set for the NTSC and PAL systems respectively so that the gate periods of the respective systems overlap with each other in a certain range, while each gate period is immediately extended when a step-out state is detected. However, even if a synchronous state is attained, the gate is opened for a considerably wide period of 224 H to 296 H in the NTSC system or 268 H to 356 H in the PAL system. Therefore, when noise is caused at a timing which is different from that of the normal vertical synchronizing signal, this noise may be erroneously decided as the vertical synchronizing signal to disable derivation of a correct vertical drive signal. Exemplary improvement of structure employable in such case is now described.

Figure 11A:
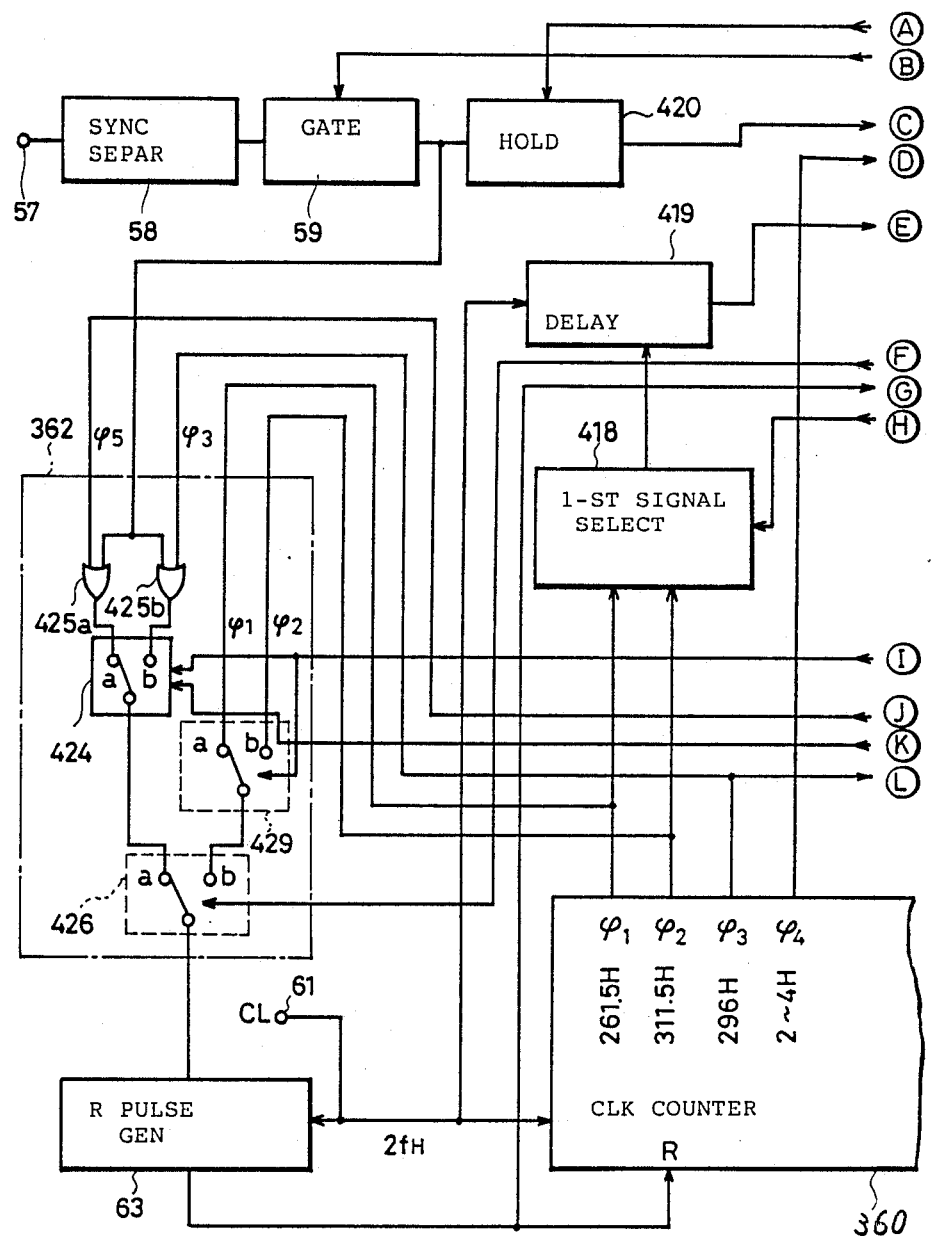
FIGS. 11A and 11B schematically illustrate overall structure of a vertical drive pulse generator according to another embodiment of the present invention.
Figure 11B:
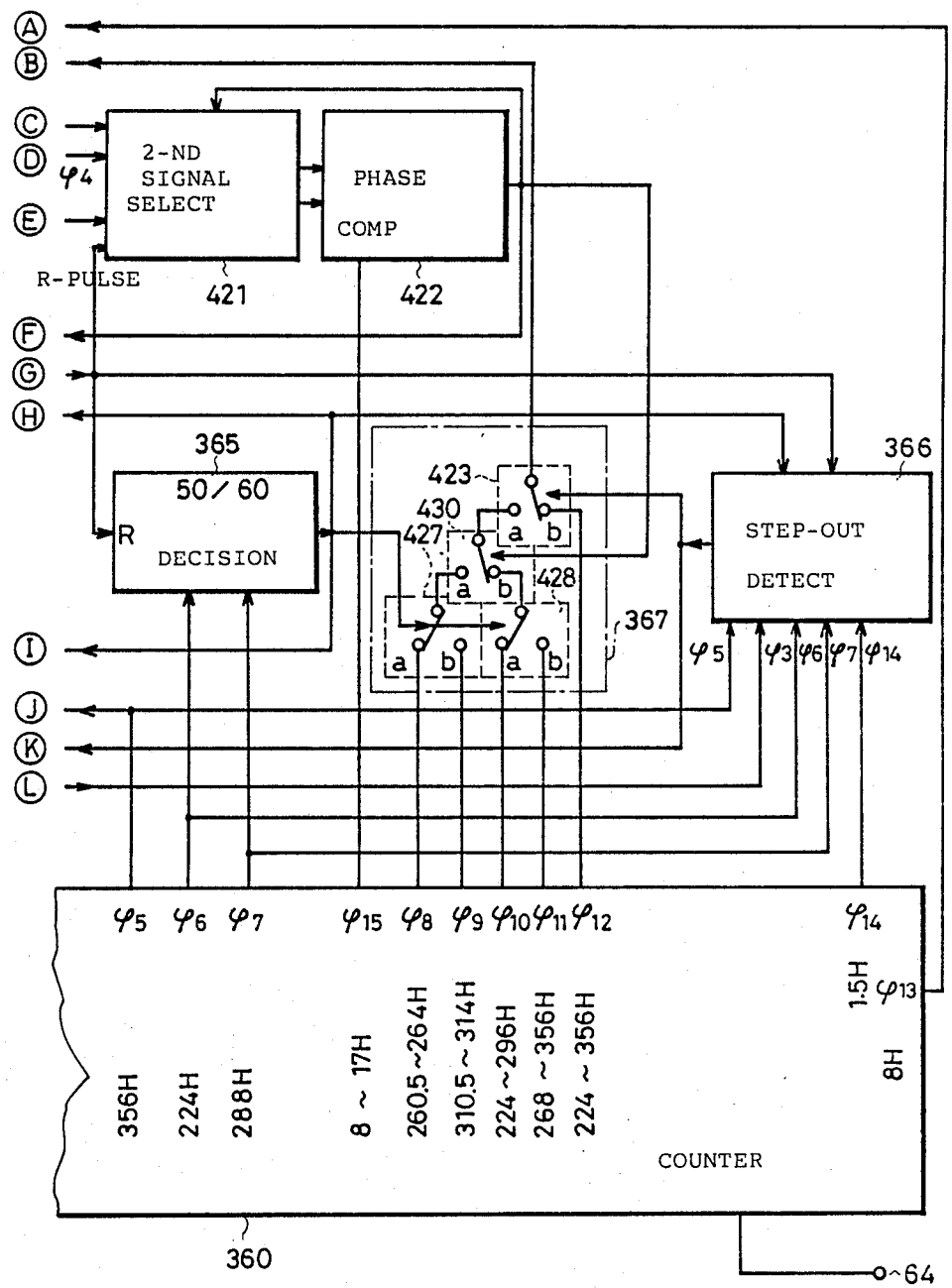

FIGS. 11A and 11B schematically illustrate overall structure of a vertical drive pulse generator according to another embodiment of the present invention. In FIGS. 11A and 11B, parts corresponding to those of the structure shown in FIG. 3 are indicated by the same reference numerals. Referring to FIGS. 11A and 11B, the vertical drive pulse generator includes a vertical sync separation circuit 58 which separates a vertical synchronizing signal from composite video signal supplied through an input terminal 57, a gate circuit 59 which is opened for a prescribed period in response to a control signal from a gate signal selection circuit 367 to pass the vertical synchronizing signal separated by the vertical sync separation circuit 58 and a vertical countdown counter circuit 360 which counts a clock signal CL of a frequency $2 f_H$ from a clock input terminal 61 and generates various control signals.

Figure 12A:
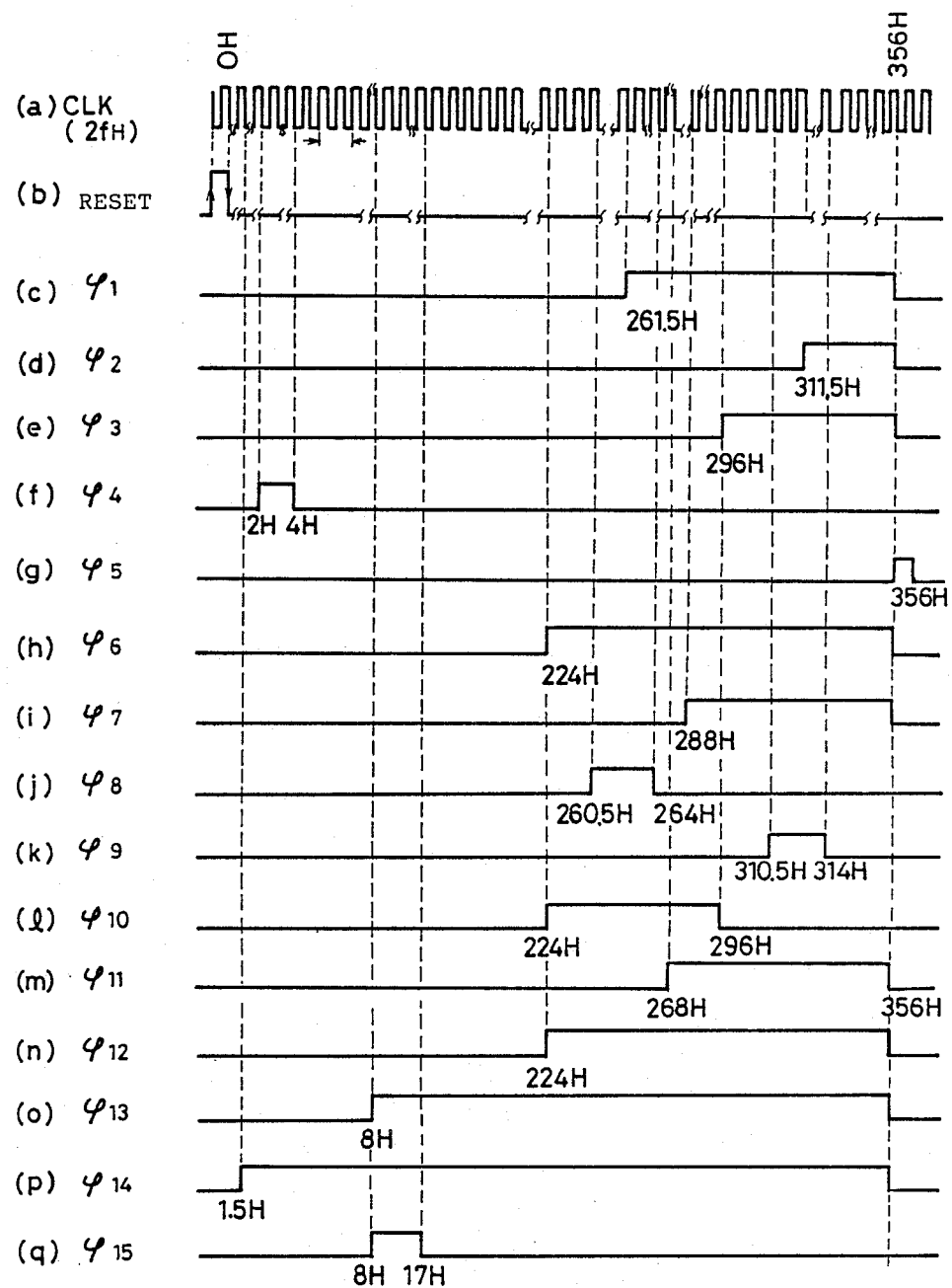
FIG. 12A shows signal waveforms of output signals from a counter circuit shown in FIGS. 11A and 11B in free run.

The vertical countdown counter circuit 360 counts the clock signal CL of the frequency $2 f_H$ and generates various control signals $\psi 1$ to $\psi 15$ in response to counts thereof, while generating a vertical drive pulse which becomes active for a prescribed period (8 H) upon supply of a reset pulse from a reset pulse generator 63 to supply the same to an output terminal 64. The vertical countdown counter circuit 360, which is analogous in structure to that shown in U.S. patent application Ser. No. 063,949 or EPC No. 20249987A2 filed in the name of the assignee, for example, includes T-FFs of 10 stages, an RS-FF and a logic gate. The T-FFs of 10 stages are adapted to frequency-divide the clock signal of the frequency $2 f_H$ applied from the clock terminal 61. The frequency-divided outputs are decoded in a decoder part formed by RS-FFs and logic gates, to derive the various types of required control signals. FIG. 12A shows signal waveforms of the control signals $\psi 1$ to $\psi 15$ generated by the vertical countdown counter circuit 360. The control signal $\psi 1$ is generated when the count value of the counter circuit 360 reaches 261.5 H. In the following description, the term "is generated" refers to "becomes active". The control signal $\psi 2$ is generated at 311.5 H. The control signal $\psi 3$ is generated at 296 H. The control signal $\psi 4$ is generated during a period of 2 H to 4 H. The control signal $\psi 5$ is generated at 356 H. The control signal $\psi 6$ is generated at 224 H. The control signal $\psi 7$ is generated at 288 H. The control signal $\psi 8$ is generated during a period of 260.5 H to 264 H after starting of counting by the counter 360. The control signal $\psi 9$ is generated during a period of 310.5 H to 314 H. The control signal $\psi 10$ is generated is generated during a period of 268 H to 356 H. The control signal $\psi 12$ is generated during a period of 224 H to 356 H. The control signal $\psi 13$ is generated at 8 H. The control signal $\psi 14$ is generated at 1.5 H. The control signal $\psi 15$ is generated during a period of 8 H to 17 H. The counting operation of the vertical countdown counter circuit 360 is reset by the reset pulse from the reset pulse generator 63.

The reset pulse generator 63 generates a signal which goes high for a one-cycle period of the clock signal CL in response to a signal from the input selection circuit 362.

The input selection circuit 362 selects one of the synchronizing signal received from the gate circuit 59 and the control signals $\psi 3$ and $\psi 5$ received from the vertical countdown counter circuit 360 in response to outputs of a 50/60 decision circuit 365 and a step-out detection circuit 366 and an output signal of a phase comparator 422, and supplies the selected signal to the reset pulse generator 63.

The input selection circuit 362 includes two OR gates 425a and 425b and three switching circuits 424, 426 and 429. The OR gate 425a receives the synchronizing signal from the gate circuit 59 and the fifth control signal $\psi 5$ from the counter circuit 360. The OR gate 425b receives the synchronizing signal from the gate circuit 59 and the third control signal $\psi 3$ from the counter circuit 360.

The switching circuit 424 selectively passes the output of either the OR gate 425a or 425b in response to a decision result output signal from the 50/60 decision circuit 365 and a detection result output signal from the step-out detection circuit 366.

The switching circuit 429 selectively passes either the first control signal $\psi 1$ or the second control signal $\psi 2$ in response to the decision result output signal from the 50/60 decision circuit 365.

The switching circuit 426 selectively passes the output of either the switching circuit 424 or 429 in response to a phase comparison result output signal from the phase comparator 422, and supplies the selected output to the reset pulse generator 63. While the respective switching circuits are shown as electrical switching circuits in the circuit structure of the input selection circuit 362, such illustration is merely adapted to functionally show the operation of the input selection circuit 362 and actual circuit structure is formed through logic gates, as hereinafter described in detail.

The 50/60 decision circuit 365 is adapted to decide whether a supplied composite video signal is of 50 Hz (PAL system) or 60 Hz (NTSC system). The 50/60 decision circuit 365 is activated in response to the sixth control signal $\Omega 6$ from the counter circuit 360 and compares the phases of the reset pulse from the reset pulse generator 63 and the seventh control signal $\psi 7$ from the counter circuit 360, to decide whether the supplied vertical synchronizing signal is of 50 Hz or 60 Hz in accordance with the result of such phase comparison.

The step-out detection circuit 366 is provided in order to detect whether or not the counter circuit 360 performs counting operation in synchronization with an externally supplied vertical synchronizing signal. This step-out detection circuit 366 decides whether or not a reset pulse is supplied within a prescribed synchronization range on the basis of the decision result output signal from the 50/60 decision circuit 365 and the third control signal $\psi 3$, the fifth control signal $\psi 5$, the sixth control signal $\psi 6$, the seventh control signal $\psi 7$ and the 14th control signal $\psi 14$ from the counter circuit 360, thereby to decide whether or not the counter circuit 360 performs counting operation in synchronization with the externally received synchronizing signal.

A gate signal selection circuit 367 is provided in order to define a gate period in the gate circuit 59. The gate signal selection circuit 367 includes four switching circuits 423, 430, 427 and 428. The switching circuit 427 passes either the control signal $\psi 8$ or the control $\psi 9$ in response to the decision result output signal from the 50/60 decision circuit 365.

The switching circuit 428 selectively passes either the control signal ψ10 or ψ11 in response to the decision result output signal from the 50/60 decision circuit 365.

The switching circuit 430 selectively passes the output of either the switching circuit 427 or 428 in response to the phase comparison result output signal from the phase comparator 422.

The switching circuit 423 selectively passes either the output of the switching circuit 430 or the 12th control signal ψ12 in response to a detection signal from the step-out detection circuit 366, and supplies the same to the gate circuit 59.

A first signal selection circuit 418, a delay circuit 419, a holding circuit 420, a second signal selection circuit 421 and the phase comparator 422 are provided in order to define the width of the gate period in the gate circuit 59.

The first signal selection circuit 418 selectively passes with the control signal ψ1 or ψ2 in response to the decision result output signal from the 50/60 decision circuit 365 and supplies the selected control signal to the delay circuit 419.

The delay circuit 419 delays the signal received from the first signal selection circuit 418 by a 1 H (0.5 H) period in response to the clock signal CL. Thus, the delay circuit 419 outputs a signal which is generated substantially at a cycle of 262.5 H or 312.5 H.

The holding circuit 420 holds the output signal of the gate circuit 59 until the 13th control signal ψ13 is received from the counter circuit 360.

The second signal selection circuit 421 selects either a set of the output signal of the holding circuit 420 and the fourth control signal ψ4 or a set of the output signal received from the delay circuit 419 and the reset pulse received from the reset pulse generator 63 in response to the output signal of the phase comparator 422, and supplies the same to the phase comparator 422.

The phase comparator 422 compares the phases of the supplied two signals, and outputs a signal responsive to the result of phase comparison. This output of the phase comparator 422 indicates whether or not the counting operation at the vertical countdown counter circuit 360 is stably synchronous with the externally supplied vertical synchronizing signal.

Figure 12B:
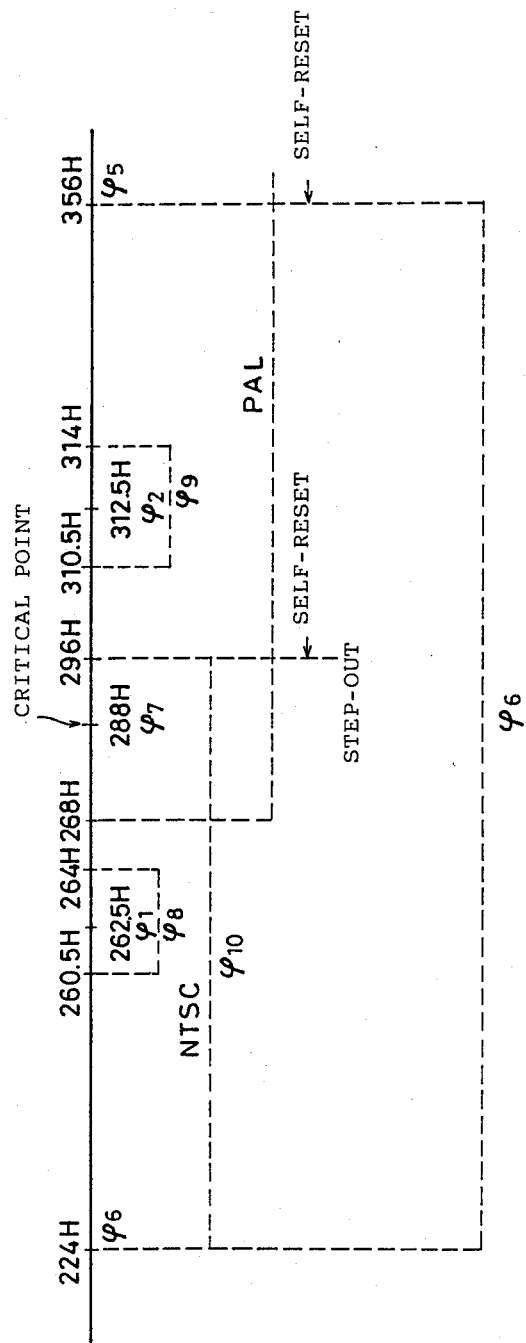
FIG. 12B illustrates relation between gate periods of a gate circuit shown in FIG. 11A and control signals of the counter circuit.

As hereinabove described, the cycle of a vertical synchronizing signal included in a video signal received from a broadcasting station is 262.5 H in the NTSC system and 312.5 H in the PAL system. According to this embodiment, therefore, a first wide gate period for the NTSC system is set in a range of 224 H to 296 including 262.5 H and a second narrow gate period is set in a range of 260.5 H to 264, as shown in FIG. 12B.

On the other hand, a first wide gate period for the PAL system is set in a range of 268 H to 356 H, and a second narrow gate period is set in a range of 310.5 H to 314 H. The timing (discrimination critical point) forming the basis for discrimination between the NTSC and PAL systems is set at 288 H. Operation is now described with reference to FIGS. 11A and 11B.

When no video signal is received, no video signal is applied to the input terminal 57. Therefore, the vertical countdown counter circuit 360 is not reset by an externally supplied synchronizing signal but sequentially counts the clock signal CL received from the clock terminal 61. When the count indicates 356 H, the counter circuit 360 generates the control signal ψ5 and applies the same to the step-out detection circuit 366. In response to the fifth control signal ψ5, the step-out detection circuit 366 generates a low-level signal indicating that the counter circuit 360 is in a step-out state, and supplies the same to the switching circuit 423 of the gate signal selection circuit 367. In response to the low-level signal from the step-out detection circuit 366, the switching circuit 423 switches its contact to b to select the 12th control signal ψ12 (224 H to 356 H), and supplies the same to the gate circuit 59 as a gate period set signal.

On the other hand, the contact of the switching circuit 424 of the input selection circuit 362 is switched to a in response to the low-level signal from the step-out detection circuit 366, to select the output of an OR gate 425a. Consequently, the fifth control signal ψ5 generated from the counter circuit 360 is supplied to the switching circuit 426 through an OR gate 420a and the switching circuit 420. The contact of the switching circuit 426 is switched to a by the output of the phase comparator 422, whereby the control signal ψ5 having the cycle of 356 H is supplied to the reset pulse generator 63. The reset pulse generator 63 generates a reset pulse in response to the fifth control signal ψ5. Since this reset pulse is defined small in pulse width of a period corresponding to one cycle of the clock signal of the frequency 2 $f_H$ supplied from the clock terminal 61 as hereinabove described, the counter circuit 60 starts counting immediately after the same is reset. This operation is again repeated so that the counter circuit 360 is reset in response to the fifth control signal ψ5. In this state, the counter circuit 360 is reset in response to the control signal ψ5 generated by the counter itself, to perform "self-reset operation". In this state, a vertical drive pulse having a cycle of 356 H is generated at an output terminal 64. In the following description, a "self-reset" state, in which the counter 360 performs reset operation in a cycle of 296 H or 356 H, is referred to as a step-out state.

In this self-reset state (step-out state), the gate period of the gate circuit 59 is set in a wide range of 224 H to 356 H, which is defined by the 12th control signal ψ12.

Consider that a video signal of the NTSC system or the PAL system is applied to the input terminal 57. A vertical synchronizing signal included in this video signal is separated by the sync separation circuit 58, and thereafter supplied to the input selection circuit 362 through the gate circuit 59.

The switching circuit 424 included in the input selection circuit 362, the structure of which is hereinafter described in detail, is adapted to respond to a switching control signal from the step-out detection circuit 366 in priority to a switching control signal from the 50/60 decision circuit 365. In this stat,, therefore, the contact of the switching circuit 424 is maintained at Thus, the vertical synchronizing signal received from the gate circuit 59 is supplied to the reset pulse generator 63 through the OR gate 425a and the switching circuits 424 and 426. The reset pulse generator 63 generates a reset pulse in response to the vertical synchronizing signal and supplies the same to the 50/60 decision circuit 365, the step-out detection circuit 366 and the vertical countdown counter circuit 360.

The 50/60 decision circuit 365, exemplary structure of which is hereinafter described in detail, performs operation similar to that of the circuit 65 shown in FIG. 3 and becomes capable of incorporating the reset pulse in response to the sixth control signal ψ6 (224 H) from the counter circuit 360, to compare the phases of the reset pulse and the seventh control signal ψ7 (288 H).

Then it counts the phase comparison result output up to a prescribed value (four, for example) through a counter and thereafter generates an output signal indicating the decision result.

The step-out detection circuit 366, the specific structure of which is hereinafter described in detail, performs operation similar to that of the circuit 66 shown in FIG. 3. Namely, this circuit is enabled to incorporate the reset pulse in response to the sixth control signal ψ6 (224 H) when a high-level output signal indicating 60 Hz is applied from the 50/60 decision circuit 365, and generates a high-level output signal indicating a synchronous state upon detection of supply of the reset pulse by a prescribed number of times. If no reset pulse arrives after the step-out detection circuit 366 becomes capable of incorporating the reset pulse, the same generates a low-level output signal indicating a step-out state in response to arrival of the third control signal ψ3 (296 H). When a low-level output signal indicating that the received synchronizing signal is of 50 Hz is supplied from the 50/60 decision circuit 365, the step-out detection circuit 366 becomes thereafter capable of incorporating the reset pulse in response to arrival of the seventh control signal ψ7 (288 H) from the counter circuit 360, and generates a high-level signal indicating a synchronous state after counting the supplied reset pulse by a prescribed number of times. If the reset pulse is not supplied by the prescribed number of times, the step-out detection circuit 366 generates a low-level signal indicating a step-out state in response to the fifth control signal ψ5 (356 H) from the counter circuit 360.

Consider that a vertical synchronizing signal of the NTSC system is separated by the sync separation circuit 58 and supplied to the gate circuit 59. In this case, the reset pulse generator 63 generates a reset pulse in response to the vertical synchronizing signal of 60 Hz and supplies the same to the 50/60 decision circuit 365. The 50/60 decision circuit 365 compares the phases of the reset pulse and the seventh control signal ψ7 (288 H). Since the reset pulse of 60 Hz precedes the seventh control signal ψ7 in phase, the 50/60 decision circuit 365 decides that the synchronizing signal of 60 Hz is received after performing such phase comparison by a prescribed number of times and generates a high-level output signal to supply the same to the switching circuits 427 and 428. Thus, the switching circuits 427 and 428 switch the contact thereof to b, thereby to select the control signals ψ9 and ψ11 generated from the counter circuit 360, respectively.

On the other hand, the switching circuit 429 included in the input selection circuit 362 switches its contact to b in response to the high-level signal from the 50/60 decision circuit 365. The step-out detection circuit 366 incorporates the reset pulse in response to the high-level signal from the 50/60 decision circuit 365, and generates a high-level signal when the reset pulse is successively received by a prescribed number of times, to indicate that synchronization is attained. In response to the high-level signal from the step-out detection circuit 366, the contact of the switching circuit 424 included in the selection circuit 462 is switched to b.

The reset pulse from the reset pulse generator 63 is also supplied to the second signal selection circuit 421. Meanwhile, the first signal selection circuit 418 selects the first control signal ψ1 (261.5 H) in response to the decision result output signal from the 50/60 decision circuit 365 and supplies the same to the delay circuit 419. The delay circuit 419 delays the received first control signal ψ1 by a prescribed period and supplies the same to the second signal selection circuit 421. The cycle of the control signal ψ1 is substantially converted to 262.5 H (262.0 H, to be exact) by the delay circuit 419.

The second signal selection circuit 421 selects the control signal ψ1 from the delay circuit 419 and the reset pulse from the reset pulse generator 63, and supplies the same to the phase comparator 422.

If the cycle of the externally supplied vertical synchronizing signal slightly deviates from 262.5 H due to influence by a weak electric field or the like, the phase comparator 420 generates a high-level signal indicating a phase mismatch. In response to the high-level signal from the phase comparator 422, the switching circuit 430 included in the gate signal selection circuit 367 switches its contact to b. Since the contact of the switching circuit 428 is at a, the control signal ψ10 from the counter circuit 360 is supplied to the gate circuit 59 through the switching circuits 428, 430 and 423 as the result. Thus, the control signal ψ0 defines the gate period of the gate circuit 59 in a wide range of 224 H to 296 H for the NTSC system.

Further, the high-level signal from the phase comparator 422 is also supplied to the switching circuit 426 included in the input signal selection circuit 362. In response to the high-level signal from the phase comparator 422, the switching circuit 426 maintains its contact at a. Thus, the vertical synchronizing signal separated by the gate circuit 59 is supplied to the reset pulse generator 63 through the switching circuits 424 and 426 regardless of the connection state, i.e., the selection state of the switching circuit 424. Consequently, the reset pulse generator 63 generates a reset pulse in correspondence to the externally supplied vertical synchronizing signal, and supplies the same to the counter circuit 360. Thus, the counter circuit 360 performs operation synchronous with the externally supplied vertical synchronizing signal and generates a vertical drive pulse which is synchronous with the externally supplied vertical synchronizing signal to supply the same to the output terminal 64.

Consider that the cycle of an externally supplied vertical synchronizing signal is substantially at 262.5 H. In this case, the comparator 422 generates a low-level signal indicating a phase match of the synchronizing signal. In response to the low-level signal from the phase comparator 422, the contact of the switching circuit 430 included in the gate signal selection circuit 367 is switched to a. Consequently, the control signal ψ8 (260.5 H to 264 H) generated from the counter circuit 360 is supplied to the gate circuit 59 through the switching circuits 420, 430 and 423. Thus, the gate period of the gate circuit 59 can be set in an extremely narrow range of 260.5 H to 264 H in a synchronous state, thereby to improve noise resistance.

On the other hand, the switching circuit 426 switches its contact to b in response to the low-level output signal from the phase comparator 422. Since the contact of the switching circuit 429 is maintained at a, the first control signal ψ1 is supplied to the reset pulse generator 3 through the switching circuits 429 and 426, as the result. As hereinabove described with reference to FIG. 7, the reset pulse generator 63 generates a reset pulse which rises in response to the signal ψ1 and falls at 262.5 H on the falling edge of the clock pulse CL. Consequently, the vertical countdown counter circuit 360 re-starts counting operation at 262.5 H, and re-generates the first control signal ψ1 when the count value reaches 261.5 H. This operation is repeated during the phase mismatch period. Therefore, the counter circuit 360 performs self-reset operation in a cycle of 262.5 H in accordance with the control signal ψ1 outputted by the counter itself, regardless of the external vertical synchronizing signal. Thus, the counter circuit 360 correctly generates the vertical drive pulse to the output terminal 64 at the cycle of 262.5 H.

When a channel or the like is switched in the aforementioned self-reset state to select another a broadcasting station and hence the externally supplied vertical synchronizing signal is varied as the result, the counter circuit 360 cannot be synchronized with the externally supplied vertical synchronizing signal. In order to avoid this state, the phase comparator 422 observes cycle variation in the externally arriving vertical synchronizing signal. The operation for observing cycle variation of the vertical synchronizing signal performed in the phase comparator 422 is now described.

When the phase comparator 422 generates a low-level output signal indicating a phase match, the second signal selection circuit 421 selects an output signal received from the holding circuit 420 and the fourth control signal ψ4 (2 H to 4 H) received from the counter circuit 360, and supplies the same to the phase comparator 422.

When the output signal of the phase comparator 422 is at a low level to indicate a phase match, the counter circuit 360 repeats self-reset operation by the control signal ψ1, as hereinabove described.

When the output signal of the phase comparator 422 goes high to indicate a phase mismatch, on the other hand, the contact of the switching circuit 426 is responsively switched to a, whereby the externally received synchronizing signal is supplied to the reset pulse generator 63 through the switching circuits 424 and 426. Consequently, the counter circuit 360 stops the self-reset operation and re-starts counting operation in synchronization with the external vertical synchronizing signal.

Further, the contact of the switching circuit 430 included in the gate signal selection circuit 367 is switched to b in response to the high-level output signal indicating a phase mismatch from the phase comparator 422, whereby the gate signal selection circuit 367 selects the control signal ψ10 and supplies the same to the gate circuit 59. Consequently, the gate period of the gate circuit 59 is again set in the range of 224 H to 296 H.

When it is confirmed that the external vertical synchronizing signal arrives substantially at the cycle of 262.5 H within the first wide gate period (224 H to 296 : ψ10) in the aforementioned structure, the gate period is switched to the second narrow range (260.5 H to 264 H: /9) so that the counter 360 performs self-reset operation at the cycle of 262.5 H in response to the control signal ψ1. Due to such structure, noise immunity of the counter circuit 360 is improved and stability against instantaneous dropout of the externally incoming vertical synchronizing signal is also improved.

The above description with reference to the NTSC system also applies to a vertical synchronizing signal of the PAL system, except for that the counter circuit 360 outputs different types of signals in the latter case. When the 50/60 decision circuit 365 generates a low-level signal indicating that the arriving vertical synchronizing signal is of 50 Hz, for example, both of the contacts of the switching circuits 427 and 428 are switched to b. Thus, the gate period of the gate circuit 59 corresponds to the ninth and 11th control signals ψ9 (310.5 H to 314 H) and ψ11 (268 H to 356 H) generated by the counter circuit 360.

In response to the low-level output signal from the 50/60 decision circuit 365, the first signal selection circuit 418 selects the second control signal ψ2 (311.5 H) generated from the counter circuit 360 and supplies the same to the delay circuit 419. Consequently, the counter circuit 360 repeats self-reset operation at a cycle of 312.5 H, which is the cycle of the vertical synchronizing signal of the PAL system, when the second control signal ψ2 is applied to the reset pulse generator 63.

Description is now made on operation performed when broadcasting system to be received is switched from NTSC system to the PAL system. Immediately after the broadcasting system is switched, the gate period of the gate circuit 59 still corresponds to the NTSC system (260.5 H to 264 H or 224 H to 296 H). Therefore, the vertical synchronizing signal of the PAL system cannot pass through the gate circuit 59 in this case. Thus, the third control signal ψ3 generated from the counter circuit 360 is supplied to the reset pulse generator 63 through the switching circuits 424 and 426. Therefore, the counter circuit 360 enters a self-reset state of repeating reset operation at a cycle of 296 H in response to the third control signal ψ3.

The step-out detection circuit 366 generates a low-level signal indicating a step-out state in response to the third control signal ψ3, and supplies the same to the switching circuit 423. The switching circuit 423 switches its contact to b in response to the low-level signal from the step-out detection circuit 366. Consequently, the 12th control signal ψ12 generated from the counter circuit 360 is supplied to the gate circuit 59 through the gate signal selection circuit 367. Thus, the gate period of the gate circuit 59 is defined by the control signal ψ12 in a range of 224 H to 365 H, so that the vertical synchronizing signal of the PAL system can be passed through the gate circuit 59. The vertical synchronizing signal of the PAL system passed through the gate circuit 59 is supplied to the reset pulse generator 63 through the input signal selection circuit 362. In response to this, the counter circuit 360 generates a vertical drive pulse which is synchronous with the vertical synchronizing signal of the PAL system and supplies the same to the output terminal 464.

A method of attaining synchronization in switching from the PAL system broadcasting to the NTSC system broadcasting is similar to the above. After performing self-reset operation at a cycle of 356 H in response to the control signal ψ5, the counter circuit 360 incorporates a subsequently supplied synchronizing signal of the NTSC system and generates a vertical drive pulse which is synchronous with the NTSC system synchronizing signal. Examples of specific structure of the circuits shown in Figs. 11A and 11B are now described.

Figure 13:
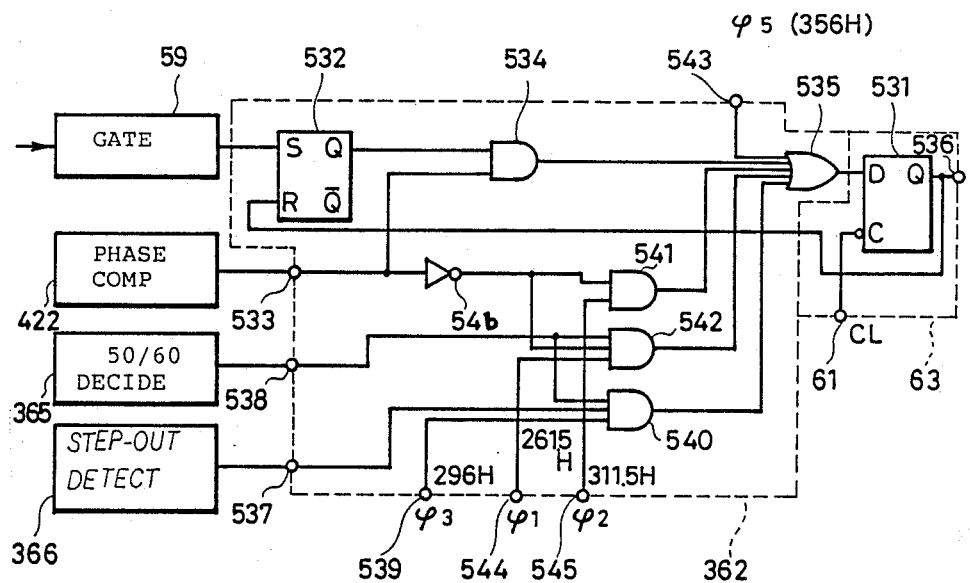
FIG. 13 is a logic diagram showing exemplary structure of an input signal selection circuit and a reset pulse generator shown in FIG. 11A.

FIG. 13 shows exemplary circuit structure of the input signal selection circuit 362 and the reset pulse generator 63 shown in FIG. 11A. Referring to FIG. 13, the input signal selection circuit 362 includes an RS-FF 532, four AND gates 534, 540, 541 and 542, an inverter 546 and an OR gate 535. The RS-FF 532 has a set input S for receiving the signal from the gate circuit 59, an output terminal Q, and a reset input R for receiving the reset pulse from the reset pulse generator 63.

The AND gate 534 receives the Q output of the RS-FF 532 and the output of the phase comparator 422.

The AND gate 540 receives the output of the 50/60 decision circuit 365 supplied through an input terminal 538, the output of the step-out detection circuit 366 supplied through an input terminal 537 and the control signal $\psi 3$ supplied through an input terminal 539.

The AND gate 541 receives the output of the phase comparator 422 supplied through the inverter 546 and the control signal $\psi 2$ supplied through an input terminal 545.

The AND gate 542 receives the output of the 50/60 decision circuit 365 supplied through the input terminal 538, the output of the phase comparator 422 supplied through the inverter 546 and the control signal $\psi 1$ supplied through an input terminal 544.

The OR gate 535 receives the control signal $\psi 5$ supplied through an input terminal 543 and respective outputs of the AND gates 534, 540, 541 and 542. The OR gate 535 supplies a signal defining timing for generating the reset pulse.

The reset pulse generator 63 has structure similar to that shown in FIG. 7, and comprises a D-FF 531, which has a D input for receiving the output of the input signal selection circuit 362 (output of the OR gate 535), a clock input C for receiving the clock signal CL supplied through the input terminal 61 and a Q output. A reset pulse is generated from the Q output of the D-FF 531 through an output terminal 536. Operation is now briefly described.

When the output of the gate circuit 59 goes high, the RS-FF 532 is set and its Q output goes high. If the output signal of the phase comparator 422 is at a high level to indicate a phase mismatch, the output of the AND gate 534 goes high and is supplied to the D input of the D-FF 531 of the reset pulse generating circuit 63 through OR gate 535. The clock input terminal C of the D-FF 531 is supplied with the clock signal CL from the clock input terminal 61. Therefore, the Q output of the D-FF 531 goes high at the falling edge of a next clock signal CL supplied after the output of the OR gate 535 goes high. The reset pulse generated from the D-FF 531 resets the RS-FF 532, whose Q output in turn falls to a low level. Consequently, when the clock signal CL subsequently falls to a low level, the output of the OR gate 535 is at a low level and hence the output of the D-FF 531 goes low. Thus, the output terminal 536 outputs a reset pulse of a fixed width defined by one cycle of the clock signal CL, in response to the external vertical synchronizing signal.

It is assumed that the output of the phase comparator 422 is at a high level and the output of the step-out detection circuit 366 is also at a high level when the RS-FF 532 is maintained in a reset state. This is a self-reset state. If the output of the 50/60 decision circuit 365 is at a high level to indicate the cycle of 60 Hz in this state, only the AND gate 540 is enabled and the control signal $\psi 3$ received through the input terminal 539 is supplied to the OR gate 535 through the AND gate 540. Consequently, the OR gate 535 outputs a signal corresponding to the control signal $\psi 3$, supplies the same to the D input of the D-FF 531. Thus, a reset pulse for making self-reset operation at a cycle of 296 H is supplied from the Q output of the D-FF 531 when the vertical synchronizing signal is dropped out.

Then, consider that the 50/60 decision circuit 365 supplies a low-level signal indicating 50 Hz when the output of the step-out detection circuit 366 is at a high level and the output of the phase comparator 422 is also at a high level while the output of the gate circuit 59 is at a low level. In this case, all of the AND gates 534, 540, 541 and 542 are in disabled states. Therefore, the control signal $\psi 5$ received through the input terminal 543 is supplied to the D input of the D-FF 531 through the OR gate 535 in this state. Thus, a reset pulse having a cycle of 356 H is generated so that the counter circuit 360 performs self-reset operation.

Consider that the output of the phase comparator 422 is at a low level to indicate a phase match when the RS-FF 532 is in a reset state. If the output of the 50/60 decision circuit 365 is at a high level for indicating 60 Hz in this state, the AND gates 541, 542 and 540 are enabled. In this case, the control signal $\psi 1$ (261.5 H) generated at the head in the control signal sequence is supplied to the OR gate 535 through the AND gate 542, and then supplied to the D input of the D-FF 531. Thus, even if the synchronizing signal of the NTSC system is dropped out, self-reset operation is performed at the cycle of 261.5 H.

Consider that the RS-FF 532 is in a reset state while the output of the phase comparator 422 is at a low level and the output of the 50/60 decision circuit 65 is also at a low level, contrarily to the above. In this case, the AND gates 540 and 542 are disabled and the control signal $\psi 2$ is supplied to the OR gate 535 through the AND gate 541. Thus, the counter circuit 360 performs self-reset operation in a cycle of 311.5 H in response to the control signal $\psi 2$.

Thus, the reset pulse generator 63 regularly generates the reset pulse in response to the first to third control signals $\psi 1$ to $\psi 3$ and the fifth control signal $\psi 5$ at its output terminal 536, in correspondence to the operating state.

Figure 14:
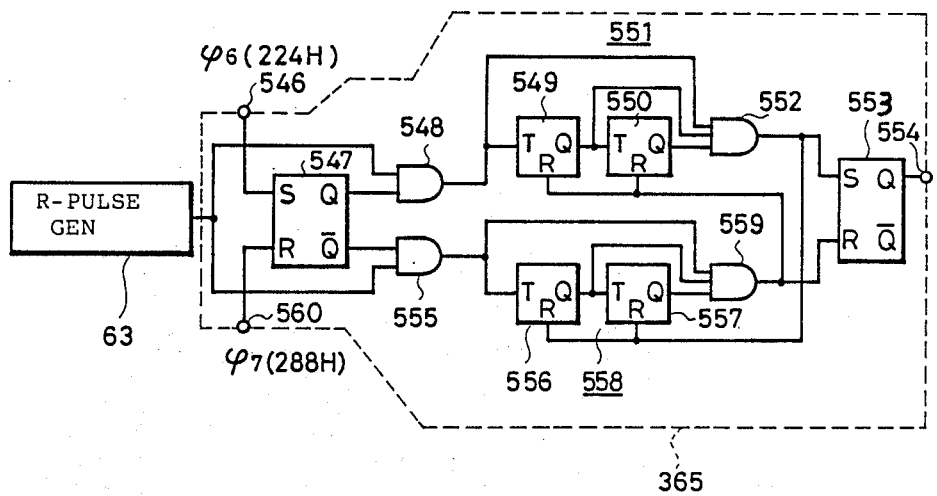
FIG. 14 illustrates exemplary structure of a 50/60 decision circuit.

FIG. 14 shows exemplary structure of the 50/60 decision circuit 365 shown in FIG. 11B. Referring to FIG. 14, the 50/60 decision circuit 365 comprises a circuit part for performing phase comparison, a circuit part for counting the result of phase comparison in the phase comparator part and a circuit part for outputting the result of decision in response to the output of the circuit part.

The circuit part for phase comparison includes an RS-FF 547 and two AND gates 548 and 555. The RS-FF 547 has a set input S for receiving the sixth control signal $\psi 6$ (224 H) supplied through an input terminal 546, a reset terminal R for receiving the seventh control signal $\psi 7$ (288 H) supplied through an input terminal, a Q output and a $\bar{Q}$ output. The AND gate 548 receives the reset pulse from the reset pulse generator 63 and the Q output of the RS-FF 547. The AND gate 555 receives the $\bar{Q}$ output of the RS-FF 547 and the reset pulse from the reset pulse generator 63.

The part for counting the phase comparison result includes two quartery counters 551 and 558. The first quartery counter 551 includes a pair of cascade-connected T-FFs 549 and 550. The T-FF 549 receives the output of the AND gate 548. The T-FF 550 receives the Q output of the T-FF 549. An AND gate 552 is provided in order to indicate that the counter circuit 551 counts a prescribed number of times, i.e., four times. This AND gate 552 receives the output of the AND gate 548, the output of the T-FF 549 and the output of the T-FF 550.

The second counter 558 includes a pair of cascade-connected T-FFs 556 and 557. The T-FF 556 receives the output of the AND gate 555 at its T input. The T-FF 557 receives the Q output of the T-FF 556 at its T output.

The T-FF 556 receives the output of the AND gate 555 at its T input. The T-FF 557 receives the Q output of the T-FF at its T input. An AND gate 559 is provided in order to indicate that phase comparison of the signal from the AND gate 555 is performed by a prescribed number of times. The AND gate 559 receives the outputs of the AND gate 555 and the T-FFs 556 and 557.

The circuit part for making a decision as to frequency of 50/60 is formed by an RS-FF 553. The RS-FF 553 has a set input S for receiving the output of the AND gate 552, a reset input R for receiving the output of the AND gate 559 and a Q output. The result of decision as to 50 Hz/60 Hz is outputted from an output terminal 554. While the structure shown in FIG. 14 is similar to that shown in FIG. 8, operation thereof is now briefly described.

Consider that a vertical synchronizing signal of the NTSC system is received. In this case, the RS-FF 547 is set in response to the sixth control signal $\psi 6$ through the input terminal 546, and its Q output goes high. In response to the high-level Q output of the RS-FF 547, the AND gate 548 is enabled. When the reset pulse generator 63 subsequently supplies a rest pulse, the output of the AND gate 548 goes high. This output of the AND gate 548 is supplied to the counter circuit 551 which is formed by the T-FFs 549 and 550. When the output of the AND gate 548 goes high for the fourth time, the output of the T-FF 550 goes high and the output of the AND gate 552 also goes high in response. Consequently, the RS-FF 533 is set and the output terminal 554 outputs a high-level signal indicating 60 Hz, to show that the NTSC system signal is received.

When a vertical synchronizing signal of the PAL system is received and the RS-FF 547 is in a set state, on the other hand, the reset pulse generator 63 supplies no reset pulse. Thus, the AND gate 548 is disabled and its output is at a low level. When the seventh control signal $\psi 7$ is supplied, the RS-FF 547 is reset and its $\overline{Q}$ output goes high, whereby the AND gate 555 is enabled. When the reset pulse generator 63 subsequently supplies a reset pulse, the output of the AND gate 555 goes high. The counter circuit 558 counts the output of the AND gate 555. Therefore, when the output of the AND gate 555 goes high four times, the output of the AND gate 559 goes high and the RS-FF 553 is reset. Thus, the output terminal 554 outputs a low-level signal indicating that the vertical synchronizing signal of 50 Hz is received.

The counter circuit 551 is reset by the output of the counter circuit 558. The counter circuit 558 is reset by the output of the counter circuit 551.

Figure 15:
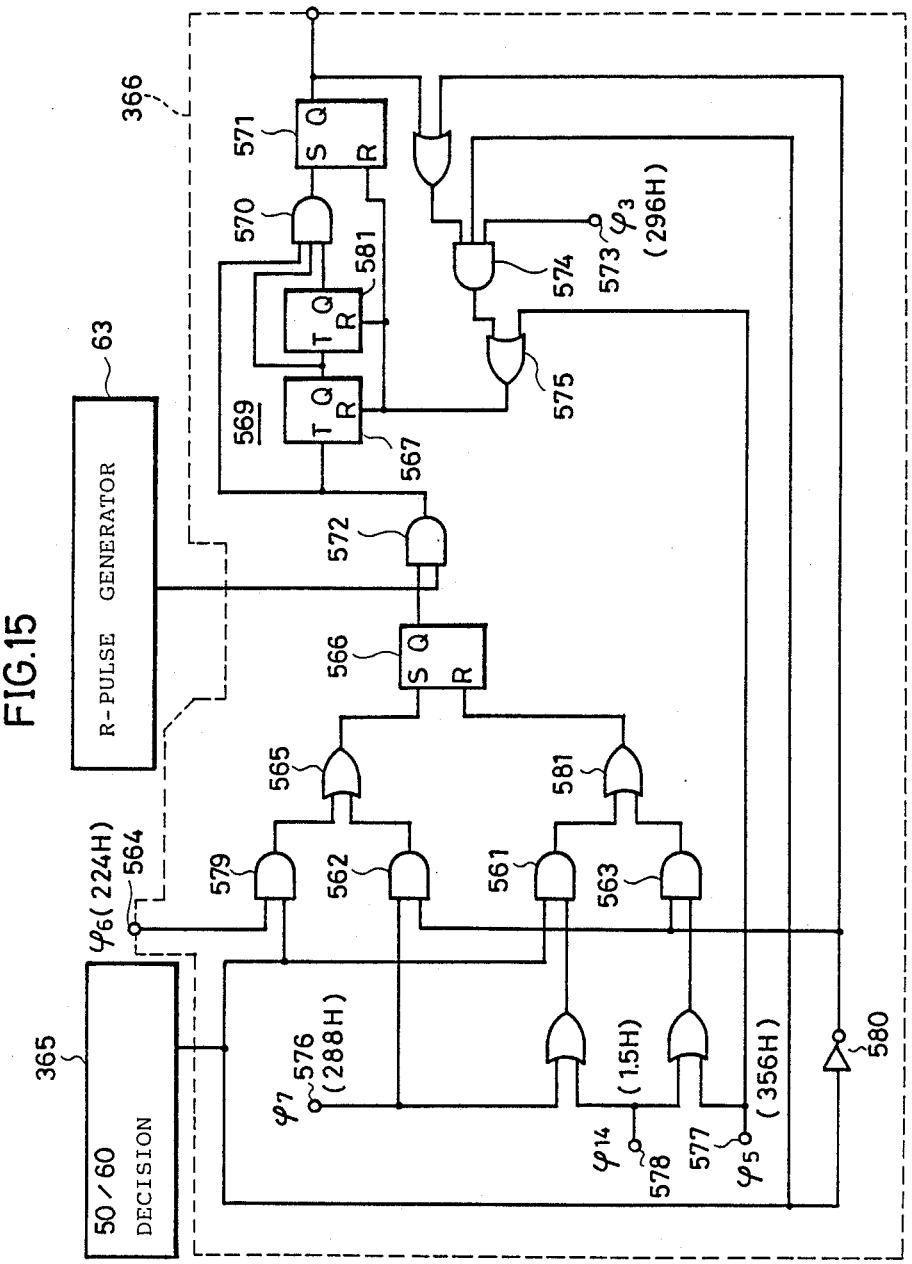
FIG. 15 is a block diagram showing exemplary structure of a step-out detection circuit shown in FIG. 11B.

FIG. 15 shows exemplary structure of the step-out detection circuit 366 shown in FIG. 11B.

The circuit shown in FIG. 15 is identical in structure to the step-out detection circuit shown in FIG. 9, except for that control signals and circuit components are indicated by different reference numerals. Thus, the operation of this circuit is similar to that of the step-out detection circuit shown in FIG. 9. Therefore, description of the circuit structure shown in FIG. 15 and its operation is omitted.

Figure 16:
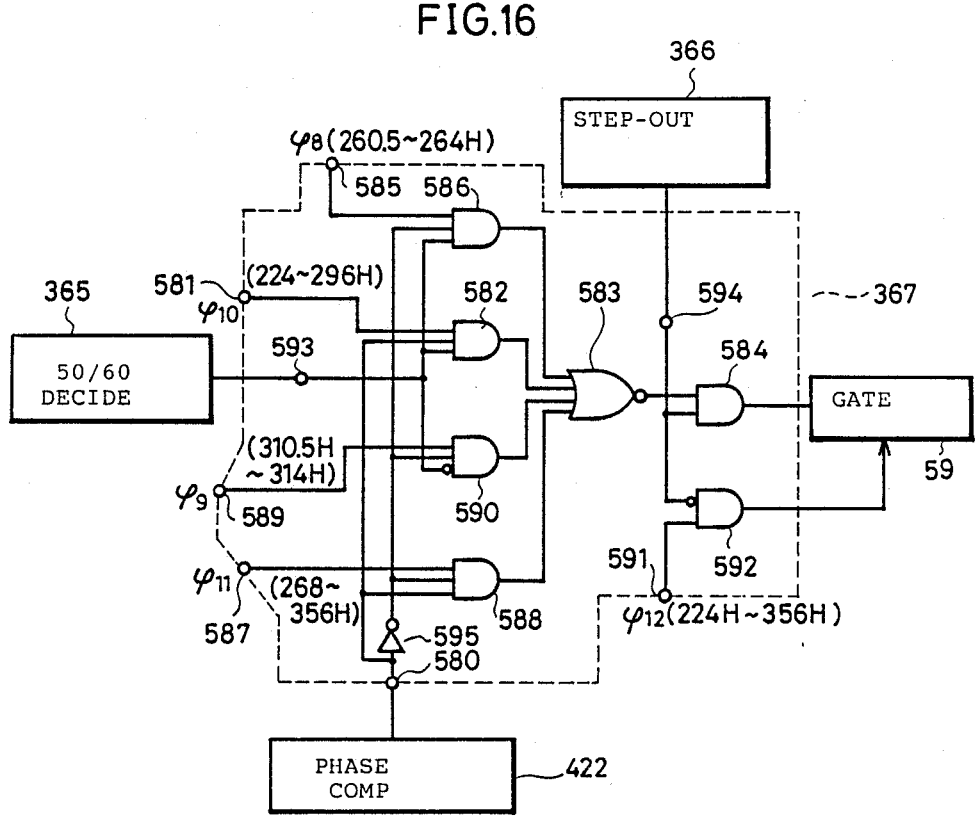
FIG. 16 is a logic diagram showing exemplary structure of a gate signal selection circuit shown in FIG. 11B.

FIG. 16 shows exemplary structure of the gate signal selection circuit 367 shown in FIG. 11B. Referring to FIG. 16, the gate signal selection circuit 367 includes a first part corresponding to the switching circuits 427, 428 and 430 and a second part corresponding to the switching circuit 423.

The first circuit part includes four AND gates 586, 582, 588 and 590, an inverter 595 and a NOR gate 583. The AND gate 582 receives the 10-th control signal $\psi 10$ supplied through an input terminal 581 and the output of the 50/60 decision circuit 365 indicating the phase comparison result from the phase comparator 422 supplied through a signal input terminal 593.

The AND gate 582 receives the control signal $\psi 8$ supplied through an input terminal 585, the output of the phase comparator 422 supplied through the inverter 595 and the output of the 50/60 decision circuit 365.

The AND gate 588 receives the control signal $\psi 11$ supplied through an input terminal 587, the output of the phase comparator 422 supplied through the inverter 595 and the output of the phase comparator 422. The AND gate 590 receives the control signal $\psi 9$ supplied through an input terminal 589, the output of the phase comparator 422 supplied through the inverter 595 and the output of the 50/60 decision circuit 365 supplied through an input terminal 593. The AND gate 590 is enabled when the output of the 50/60 decision circuit 365 is at a low level.

The NOR gate 583 receives the outputs of the AND gates 582, 586, 588 and 590.

The second circuit part includes AND gates 584 and 592. The AND gate 584 receives the output of the step-out detection circuit 366 supplied through an input terminal 594 and the output of the NOR gate 583.

The AND gate 592 receives the control signal $\psi 12$ supplied through an input terminal 591 and the output of the step-out detection circuit 366. The AND gate 592 is enabled when the output of the step-out detection circuit 366 is at a low level. Operation is now briefly described.

Consider that the output signal of the step-out detection circuit 366 is at a high level to indicate a synchronous state while the output of the 50/60 decision circuit 365 is also at a high level to indicate that the synchronizing signal of the NTSC system is received. When the output signal of the phase comparator 422 goes high in this state, only the AND gate 582 is enabled. The 10-th control signal $\psi 10$ (224 H to 296 H) from the input terminal 581 is supplied to the NOR gate 583 through the enabled AND gate 582.

On the other hand, the AND gate 584, which is enabled by the high-level signal from the step-out detection circuit 366, passes the output of the NOR gate 583 and supplies the same to the gate circuit 59. Thus, the gate period of the gate circuit 59 is set in a range of 224 H to 296 H, which is defined by the control signal $\psi 10$.

When the phase comparator 422 outputs a low-level signal indicating a phase match in this synchronous state for the NTSC system, the control signal $\psi 8$ (260.5 H to 264 H) from the input terminal 585 is supplied to the NOR gate 583 through the enabled AND gate 586. The output of the NOR gate 583 is supplied to the gate circuit 59 through the AND gate 584. Consequently, the gate period of the gate circuit 59 is defined by the control signal $\psi 8$ to be a narrow range of 260.5 H to 264 H in the synchronous state.

Consider that the step-out detection circuit 366 outputs a high-level signal indicating a synchronous state and the 50/60 decision circuit 365 outputs a low-level signal indicating 50 Hz while the phase comparator 422 outputs a high-level signal indicating a phase mismatch. In this case, only the AND gate 588 is enabled and hence the control signal $\psi 11$ (268 H to 356 H) received through the input terminal 587 is supplied to the NOR gate 583. Since the AND gate 584 is in an enabled state, the control signal ψ11 is supplied to the gate circuit 59 through the NOR gate 583 and the AND gate 584. Thus, the gate period of the gate circuit 59 is set in a wide range of 268 H to 356 H, which is defined by the control signal ψ11

When the phase comparator 422 outputs a low-level signal indicating a phase match in the synchronous state for the PAL system, only the AND gate 590 is enabled. Thus, the control signal ψ9 (310.5 H to 314 H) received through the terminal 589 is supplied to the AND gate 584 through the AND gate 590 and the NOR gate 583. Consequently, the gate period of the gate circuit 59 is set in a narrow range of 310.5 H to 314 H, which is defined by the control signal ψ9.

When the output of the step-out detection circuit 366 goes low to indicate a step-out state, the AND gate 592 is enabled and the control signal ψ12 (224 H to 356 H) received through the input terminal 591 is supplied to the gate circuit 59. Thus, the gate period of the gate circuit 59 is set in a range of 224 H to 356 H, which is defined by the control signal ψ12, in an asynchronous state.

While the AND gate 584 outputs a signal obtained by inverting the gate control signal in the aforementioned structure, the gate period can be defined if an OR gate for receiving the output of the AND gate 584 in its false input and receiving the output of the AND gate 592 in its true input is employed for an input part of the gate circuit 59 and the output of this OR gate is supplied to a first input of an AND gate for receiving the output of the separation circuit 58.

Figure 17:
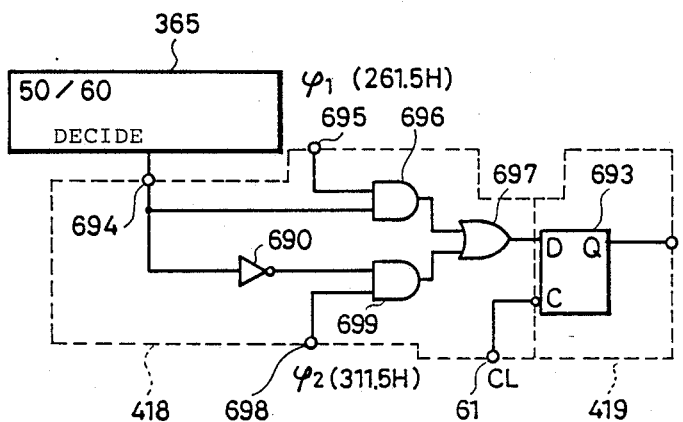
FIG. 17 is a logic diagram showing exemplary structure of a delay circuit shown in FIG. 11A.

FIG. 17 shows exemplary structure of the first signal selection circuit 418 and the delay circuit 419 shown in FIG. 11A. Referring to FIG. 17, the first signal selection circuit 418 includes an inverter 690, two AND gates 696 and 699 and an OR gate 697. The inverter 690 receives the output of the 50/60 decision circuit 365. The AND gate 696 receives the output of the 50/60 decision circuit 365 supplied through an input terminal 694 and the control signal ψ1 supplied through an input terminal 695. The AND gate 699 receives the output of the inverter 690 and the control signal ψ2 supplied through an input terminal 698. The NOR gate 697 receives the outputs of the AND gates 696 and 699.

The delay circuit 419 is formed by a D-FF 613, which has a D input for receiving the output of the OR gate 697, a clock input C for receiving the clock signal CL supplied through the input terminal 61 and an output terminal Q. Operation is now briefly described.

Consider that the output of the 50/60 decision circuit 365 is at a high level to indicate that an NTSC system signal of 60 Hz is received. In this case, the AND gate 696 is enabled and the control signal ψ1 received from the input terminal 695 is supplied to the OR gate 697 through the AND gate 696. Thus, the control signal ψ1 is supplied to the D input of the D-FF 693. The D-FF 693 incorporates the output of the OR gate 697 on the leading edge of the clock signal CL supplied from the input terminal 61 and outputs the same from its Q output. Thus, the D-FF 693 delays the output of the OR gate 697 by one clock, i.e., 0.5 H, and outputs the same.

When the output of the 50/60 decision circuit 365 is at a low level to indicate that the received signal is of the PAL system, on the other hand, the AND gate 699 is enabled. Thus, the control signal ψ2 is selected through the input terminal 698 and supplied to the D input of the D-FF 693 through the OR gate 697. This control signal ψ2 is delayed by a period of 0.5 H similarly to the above, and thereafter outputted from the Q output of the D-FF 693.

Figure 18:
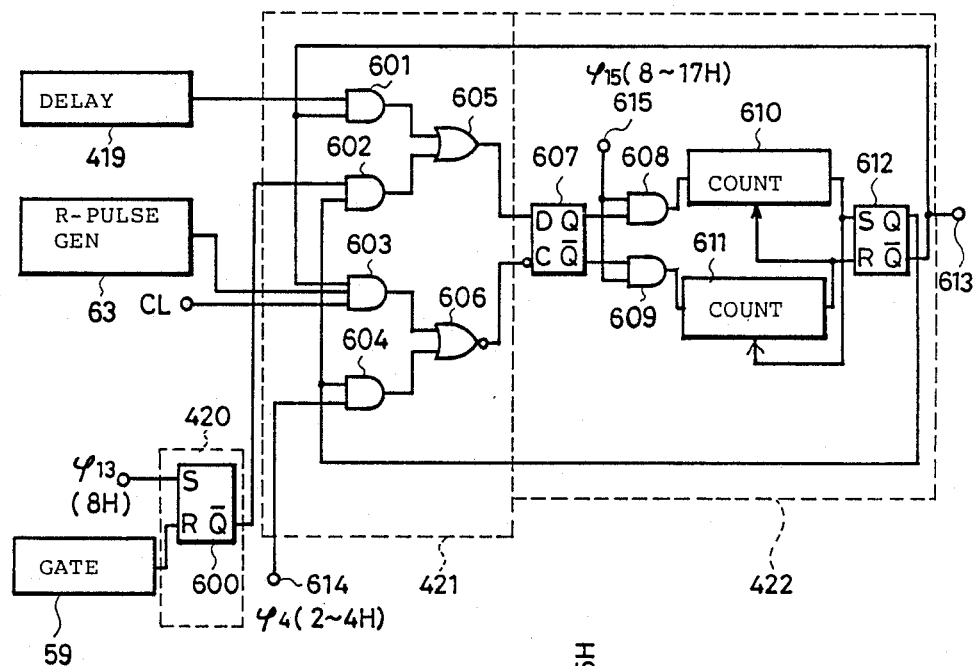
FIG. 18 is a logic diagram showing exemplary structure of a second signal selection circuit and a phase comparator shown in FIG. 11B.

FIG. 18 shows exemplary structure of the holding circuit 420, the second signal selection circuit 421 and the phase comparator 422 shown in FIGS. 11A and 11B.

Referring to FIG. 18, the holding circuit 420 is formed by an RS-FF 600. The RS-FF 600 receives the output of the gate circuit 59 in its reset input R. The $\overline{Q}$ output of the RS-FF 600 provides the output of the holding circuit 420.

The second signal selection circuit 421 includes four AND gates 601, 602, 603 and 604, an OR gate 605 and a NOR gate 606. The AND gate 601 receives the output of the delay circuit 419 and the $\overline{Q}$ output of an RS-FF 612 included in the second output selection circuit 421. The AND gate 602 receives the $\overline{Q}$ output of the RS-FF 600 and the Q output of the RS-FF 612. The AND gate 603 receives the $\overline{Q}$ output of the RS-FF 612, the reset pulse from the reset pulse generator 63 and the clock signal CL. The AND gate 604 receives the control signal ψ4 supplied through an input terminal 614 and the Q output of the RS-FF 612. The OR gate 605 receives the outputs of the AND gates 601 and 602. The NOR gate 606 receives the outputs of the AND gates 603 and 604.

The phase comparator 422 includes a D-FF 607, two AND gates 608 and 609, two counter circuits 610 and 611 and the RS-FF 612. The D-FF 607 has a D input for receiving the output of the OR gate 605, a clock input C for receiving the output of the NOR gate 606, a Q output and a $\overline{Q}$ output. The AND gate 608 receives the Q output of the D-FF 607 and the control signal ψ15 supplied through an input terminal 615. The AND gate 609 receives the control signal ψ15 and the $\overline{Q}$ output of the D-FF 607. The counter circuit 610 counts the output of the AND gate 608. The counter circuit 611 counts the output of the AND gate 609. The RS-FF 612 has a set input S for receiving the output of the counter circuit 610, a reset input R for receiving the output of the counter circuit 611, a Q output and a $\overline{Q}$ output. The output of the counter circuit 610 resets counting operation of the counter circuit 611, while the output of the counter circuit 611 resets counting operation of the counter circuit 610.

Operations of the holding circuit 420 and the second signal selection circuit 421 are now described.

Consider that the $\overline{Q}$ output of the RS-FF 612 is at a high level to indicate a phase mismatch. At this time, the AND gates 601 and 603 are enabled while the AND gates 602 and 604 are disabled. Thus, the output of the delay circuit 419 is supplied to the D input of the D-FF 607 through the AND gate 601 and the OR gate 605. Further, the reset pulse from the reset pulse generator 63 is supplied to the NOR gate 606 through the AND gate 603 during a high-level period of the clock signal CL. The output of the NOR gate 606 is supplied to the clock input C of the D-FF 607. Thus, the phase comparator 422 compares the phases of the output signal of the delay circuit 419 and the reset pulse from the reset pulse generator 63.

Figure 19:
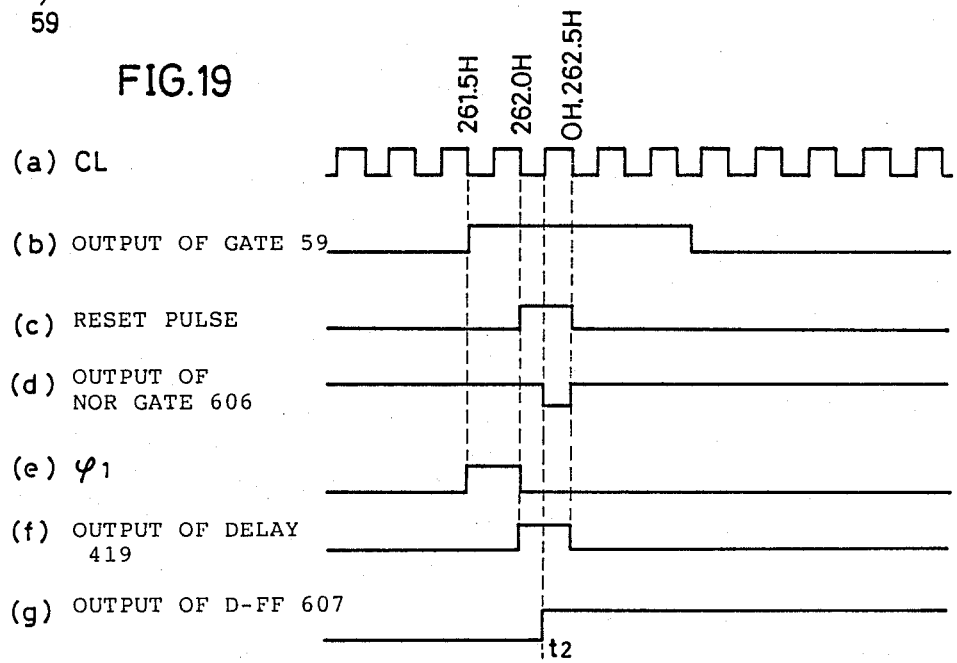
FIG. 19 is a signal waveform diagram showing operation of the phase comparator shown in FIG. 18.

Consider that the $\overline{Q}$ output of the RS-FF 612 is at a low level to indicate a synchronous state, contrarily to the above. In this case, the AND gates 602 and 604 are enabled. Thus, the $\overline{Q}$ output of the holding circuit 420 (RS-FF 600), which is reset in response to the output of the gate circuit 59, is supplied to the D input of the D-FF 607 through the AND gate 602 and the OR gate 605. Further, the control signal ψ4 received from the input terminal 614 is supplied to the clock input C of the D-FF 07 through the AND gate 604 and the NOR gate 606. Thus, the phase comparator 422 compares the phases of the output signal from the holding circuit 420 (i.e., synchronizing signal gated by the gate circuit 59) and the fourth control signal ψ4. The phase comparing operation of the phase comparator 422 is now described with reference to FIG. 19, which is a waveform diagram thereof.

It is assumed that the output of the phase comparator 422 (signal level at an output terminal 613) is at a high level to indicate a phase mismatch. First, consider that the gate circuit 59 generates a vertical synchronizing signal (FIG. 19(b)) when the clock signal CL (FIG. 19(a)) is at 261.5 H and supplies the same to the reset pulse generator 63. In this state, the reset pulse generator 63 generates a reset pulse (FIG. 19(c)) which rises with a delay by 0.5 H to the vertical synchronizing signal, and supplies the same to the AND gate 603. Since the output of the phase comparator 422 is currently at a high level, the AND gate 603 is in an enabled state. Therefore, the logical product of the reset pulse and the clock signal CL is obtained through the AND gate 603, and thereafter to be supplied to the NOR gate 606. Consequently, the NOR gate 606 generates an output signal which is shown at FIG. 19(d), and supplies the same to the clock input C of the D-FF 607.

The control signal ψ1 (FIG. 19(e)) is passed from the first signal selection circuit 418 (see FIG. 11A) and supplied to the delay circuit 419, to be delayed by 0.5 H in the delay circuit 419 and thereafter supplied to the AND gate 601 (see FIG. 19(f)). Consequently, the output of the OR gate 605 passes this output of the delay circuit 419 and supplies the same to the D input of the D-FF 607. The D-FF 607 is of a down edge trigger type, which incorporates a signal received at its D input in synchronization with fall of the clock signal CL received at its clock input C and outputs the same. Thus, the D-FF 607 outputs a signal which rises to a high level at the falling edge of the output of the NOR gate 606 from its Q output (FIG. 19(g)). The Q output of the D-FF 607 is supplied to the AND gate 608. Thus, the AND gate 608 is enabled and the AND gate 609 is disabled. The enabled AND gate 608 passes the control signal ψ15 received from the input terminal 615 and supplies the same to the counter circuit 610. The counter circuit 610 counts the control signal ψ15 by a predetermined number of times (four times, for example), and then outputs a high-level signal to set the RS-FF 612, so that its $\overline{Q}$ output goes low. Thus, the gate period of the gate circuit 59 is set in a narrow range of 260.5 H to 264 H as hereinabove described, while self-reset operation is performed in response to the control signal ψ1 (261.5 H) from the counter circuit 360 (see FIGS. 11A and 112B).

When the $\overline{Q}$ output of the RS-FF 612 goes low, on the other hand, the AND gates 601 and 603 are disabled and the AND gates 602 and 604 are enabled. Thus, the control signal ψ4 (2 H to 4 H) is supplied to the clock input C of the D-FF 607 through the input terminal 614, the AND gate 604 and the NOR gate 606. Similarly, the synchronizing signal from the gate circuit 59 is held by the holding circuit 420, and the held synchronizing signal is supplied to the D input of the D-FF 607 through the AND gates 602 and 605. Thus, the synchronizing signal from the gate circuit 59 and the control signal ψ4 are subjected to phase comparison.

If the reset pulse from the reset pulse generator 63 is not in phase with the signal from the delay circuit 419 in the aforementioned state, i.e., when the output signal of the phase comparator 422 is at a high level, the Q output of the D-FF 607 goes low while its $\overline{Q}$ output goes high, contrarily to the above. Thus, the AND gate 609 is enabled and the counter circuit 611 counts the control signal ψ15. When the count of the counter circuit 611 reaches a prescribed value (four times counting, for example), the RS-FF 612 is reset and the $\overline{Q}$ output thereof goes high to indicate a phase mismatch. Thus, the gate period of the gate circuit 59 can be set in two types of narrow and wide ranges.

Figure 20:
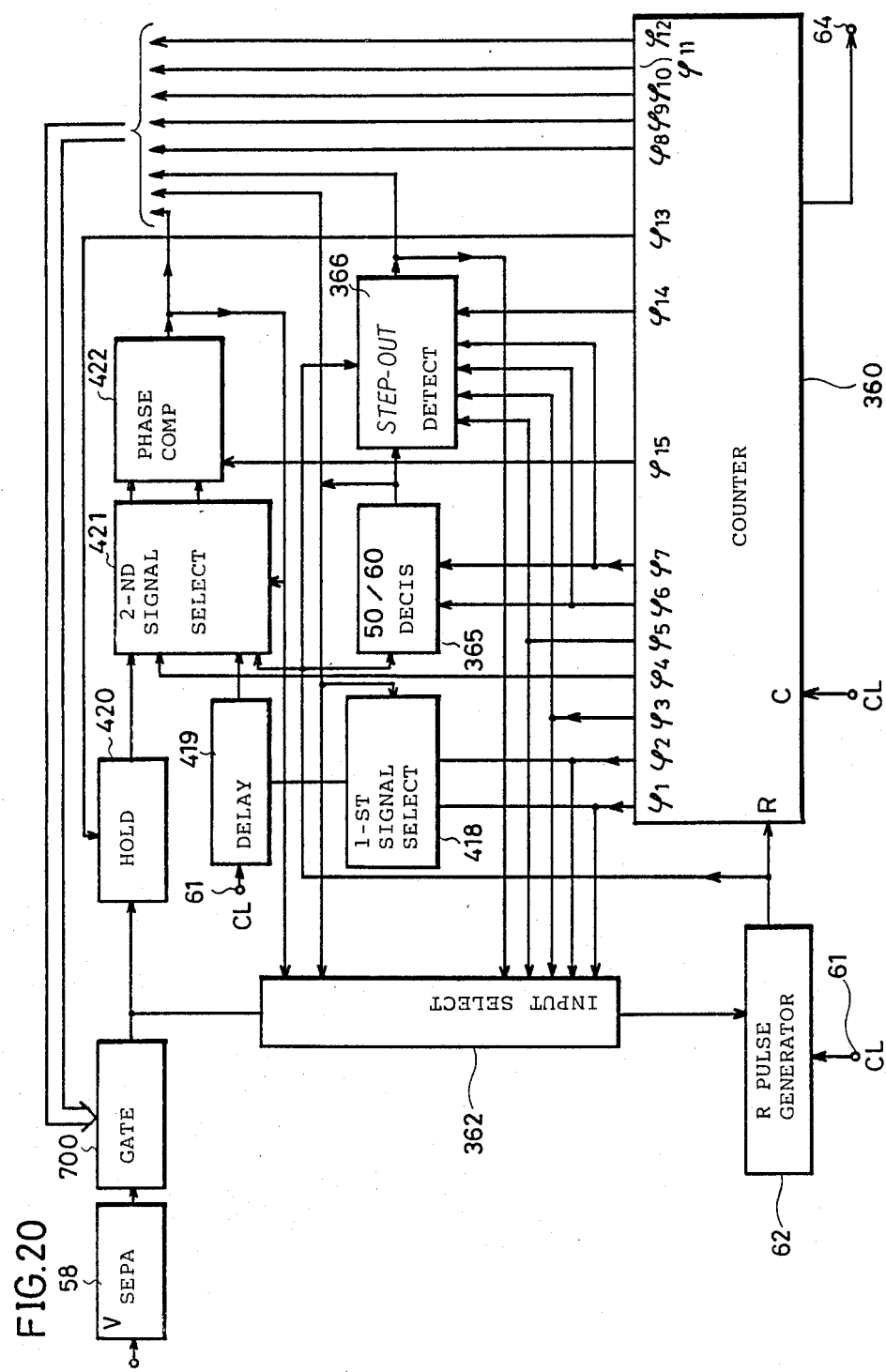
FIG. 20 schematically illustrates overall structure of a vertical drive pulse generator according to still another embodiment of the present invention.

In the aforementioned embodiment, only one gate circuit 59 is provided and its gate period is set by the gate period defining control signal from the gate signal selection circuit 367. However, an alternative gate circuit assembly 700 may be formed by a plurality of parallel gate circuits, which are opened only for prescribed gate periods respectively, so that the outputs of such gate circuits are selectively switched by the outputs of a 50/60 decision circuit 365, a phase comparator 422 and a step-out detection circuit 366 and supplied to an input selection circuit 362, as shown in FIG. 20. FIG. 21 shows exemplary concrete structure of such gate circuits provided in correspondence to respective gate periods.

Referring to FIG. 21, the gate circuit assembly 700 comprises gate circuits 701 and 702 for receiving television broadcasting signals, gate circuits 703 and 704 for VCR (video cassette recorder) reproduction signals and a gate circuit 705 for setting a wide gate period in an asynchronous state. The gate circuit 701 is opened in response to a control signal ψ8 (260.5 H to 264 H), and passes a supplied signal. The gate circuit 702 is opened in response to a control signal ψ9 (310.5 H to 314 H), and passes a signal from a sync separation circuit 58. The gate circuit 703 passes the signal from the sync separation circuit 58 in response to a control signal ψ12 (220 H to 296 H). The gate circuit 704 passes a supplied signal in response to a control signal ψ11 (268 H to 356 H). The gate circuit 705 is opened in response to a control signal ψ12 (224 H to 356 H) and passes a supplied signal. The gate circuit 701 is adapted to define a narrow gate period after synchronization is attained for the NTSC system. The gate circuit 702 is adapted to define a narrow gate period after synchronization is attained for the PAL system. The gate circuit 703 is adapted to set a wide gate period for the NTSC system. The gate circuit 704 is adapted to set a wide gate period for the PAL system. The gate circuit 705 is adapted to set the widest gate period for an asynchronous state.

Selection circuits 710, 711, 712 and 713 are provided in order to select the outputs of the gate circuits 701 to 705. The selection circuit 710 selectively passes the output of either the gate circuit 701 or 702 in response to a decision result output signal from the 50/60 decision circuit 365. The selection circuit 711 selectively passes the output signal of either the gate circuit 703 or 704 in response to the output signal from the 50/60 decision circuit 365. The selection circuit 712 passes the output signal of either the selection circuit 710 or 711 in response to the signal from the phase comparator 422. The selection circuit 713 passes the signal of either the selection circuit 712 or the gate circuit 705 in response to the signal from the step-out detection circuit 366.

Symbols TV and VTR in the input part of the selection circuit 712 have the following meaning: A synchronizing signal included in a video signal transmitted from a broadcasting station is stable, and after synchronization thereto is attained, the gate period of the gate circuit may simply be set in a narrow range. When the received video signal is from the broadcasting station, the output of the phase comparator 422 selects a signal passed through the narrow gate period after detection of synchronization. On the other hand, a vertical synchronizing signal of a VCR (VTR) is instabilized in reproduction, and hence the phase comparator 422 generally outputs a high-level signal indicating a phase mismatch. In this case, the selection circuit 712 selects the output of the gate circuit 703 or 704 having a wide gate period. Thus, symbols TV and VTR may be regarded as corresponding to a synchronous state and an instabilizing synchronous state respectively. In response to the output signal from the step-out detection circuit 366, the selection circuit 713 selects the output of the selection circuit 712 in a synchronous state while selecting the output of the gate circuit 705 in an asynchronous state. Further, the selection circuit 710 selects the gate circuits 702 and 704 for the PAL system when the output signal of the 50/60 decision circuit 365 indicates 50 Hz, while selecting the gate circuits 701 and 703 for the NTSC system when the output signal indicates the NTSC system of 60 Hz.

An effect similar to that of the embodiment provided with the single gate circuit can be attained through the gate circuit assembly of the aforementioned structure.

The above embodiment has been described with reference to the structure of switching between the NTSC and PAL systems for switching the vertical synchronizing signals. However, this structure is also applicable to simple generation of a vertical drive pulse in the PAL system, generation of a vertical drive pulse only for the NTSC system, or synchronous control of a vertical drive pulse for the SECAM system.

Further, the present invention is also applicable to structure for switching among the PAL, NTSC and SECAM systems in place of the aforementioned NTSC and PAL systems. In other words, the present invention is applicable to any broadcasting systems, which have different cycles of vertical synchronizing signals.

In addition to the vertical drive pulse generator in a receiver for simply receiving a video signal transmitted from a broadcasting station as hereinabove described, the present invention is also applicable to a vertical drive pulse generator employed for reproducing a video signal from a personal computer or a video cassette tape recorder.

According to the present invention, as hereinabove described, specific gate periods can be set responsively for vertical synchronizing signals of different broadcasting systems, whereby a vertical drive pulse can be regularly generated in correct timing with no influence exerted by external noise.

According to the present invention, further, two gate periods overlap with each other in the vicinity of the discrimination critical point between the broadcasting systems having different vertical cycles. Thus, a vertical synchronizing signal supplied in the vicinity of the discrimination critical point can be also incorporated without extending the gate period, whereby vertical synchronization can be stably attained at a high speed in VCR reproduction, for example.

In addition, a wide gate period is set to pass all of a plurality of vertical synchronizing signals in a step-out state according to the present invention, whereby it is possible to extremely reduce a period required for transition from a self-reset state to a synchronous state for an externally supplied vertical synchronizing signal.

According to the present invention, further, a pair of wide and narrow gate periods are provided for each vertical synchronizing signal so that the gate period is switched to the second narrow range when it is confirmed that the vertical synchronizing signal is present in the wide gate period. Also when the gate period is set in the narrow range, the cycle of the externally supplied vertical synchronizing signal is so observed that the operation of the counter for generating a control signal such as a vertical drive pulse is synchronized with the externally supplied vertical synchronizing signal if variation is caused in the external vertical synchronizing signal, whereby the vertical driving pulse can be regularly stably generated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for generating a vertical drive pulse for defining a vertical scanning period of a display screen in response to a vertical synchronizing signal included in a video signal to be displayed, said apparatus receiving video signals in accordance with at least first and second broadcasting systems having different cycles of the vertical synchronizing signals, said apparatus comprising:

gate means (59; 70) for passing said vertical synchronizing signal included in said video signal to be displayed;

counter means (60; 360) for counting a clock signal and generating said vertical drive pulse and a plurality of timing signals ($\phi 1$ to $\phi 8$; $\psi 1$ to $\psi 15$) synchronous with said clock signal, said clock signal having a frequency integral times that of a horizontal synchronizing signal included in said video signal, said plurality of timing signals including at least a first timing signal ($\phi 6$; $\psi 10$) for defining a first gate period corresponding to said first broadcasting system, a second timing signal ($\phi 7$; $\psi 11$) for defining a second gate period corresponding to said second broadcasting system and a third timing signal ($\phi 8$; $\psi 12$) for defining a third gate period including said first and second gate periods;

means (62, 63, 65; 362,363,365) for deciding whether said video signal to be displayed is that of said first broadcasting system or that of said second broadcasting system in response to said vertical synchronizing signal from said gate means; and gate period set means (66, 67; 366, 367) for selecting either said first or second timing signal in response to a decision result output from said decision means and supplying the selected timing signal to said gate means thereby to set a signal passage period in said gate means, said gate period set means further including means (66, 69; 423) for selecting said third timing signal and applying the same to said gate means when said vertical synchronizing signal is not received in a predetermined period set for respective said first and second broadcasting systems.

2. An apparatus in accordance with claim 1, wherein said first and second timing signals partially overlap with each other in a certain range.

3. An apparatus in accordance with claim 1, further including:
input selection means (62; 362) for receiving an output signal from said gate means and generating a signal corresponding to said vertical synchronizing signal, and
means (63) for generating a reset pulse in response to said output signal from said input selection means, said reset pulse resetting counting operation of said counter means for generation of said vertical drive pulse therefrom,
said counter means generating timing signals ($\phi3$, $\phi4$; $\psi6$, $\psi7$) providing the basis of discrimination between said broadcasting systems,
said decision means including:
means (131, 132, 135, 136, 137, 139, 143, 142; 547, 548, 551, 552, 553, 555, 558, 559) for comparing phases of said reset pulse and said timing signals providing the basis of discrimination between said broadcasting systems.

4. An apparatus in accordance with claim 2, wherein said gate means receives all of externally supplied said vertical synchronizing signals.

5. An apparatus in accordance with claim 3, wherein said gate period set means includes synchronization detection means (66; 366) for deciding whether or not said reset pulse is generated within a gate period defined by said first or second timing signal in response to the output of said decision means and said reset pulse and for controlling timing signal selection operation in said gate period set means in accordance with the result of said decision.

6. An apparatus in accordance with claim 5, wherein said counter means generates fourth and fifth timing signals ($\phi1$, $\phi2$; $\psi3$, $\psi1$) for self-reset operation corresponding to said first and second broadcasting systems, and
said input selection means includes:
first signal passage means (71a) for passing the output of said gate means and said fourth timing signal,
second signal passage means (71b) for passing the output of said gate means and said fifth timing signal, and
means (70) for selectively passing the output of either said first or second signal passage means in response to outputs of said decision means and said synchronization detection means.

7. An apparatus in accordance with claim 5, wherein said gate period set means includes:
first selection means (68) for selectively passing either said first or second timing signal in response to the output of said decision means, and
second selection means (69) for selectively passing either the output of said first selection means or said third timing signal in response to the output of said synchronization detection means and supplying the selected output to said gate means.

8. An apparatus in accordance with claim 1, wherein said counter means generates a fourth timing signal ($\psi8$) for defining a gate period shorter than that defined by said first timing signal and a fifth timing signal ($\psi9$) for defining a gate period shorter than that defined by said second timing signal,
said apparatus further comprising:
phase detection means (418, 421, 422) for detecting whether or not said vertical synchronizing signal is supplied in a determined cycle specific to either one of said broadcasting system,
said gate period set means including:
means (423, 427, 428, 430) for selectively outputting one of said first to fifth timing signals in response to the outputs of said broadcasting system decision means, said synchronization detection means and said phase detection means,
said selective output means selectively outputting either said fourth or fifth timing signal in response to the output of said broadcasting system decision means when said phase detection means indicates that said vertical synchronizing signal is supplied in said specific phase.

9. An apparatus in accordance with claim 8, wherein said counter means derives sixth sand seventh timing signals ($\psi1$, $\psi2$) respectively corresponding to said cycles of said vertical synchronizing signals specific to said broadcasting systems and eighth and ninth timing signals ($\psi5$, $\psi3$) for self-reset operation corresponding to respective said broadcasting systems,
said apparatus further comprising:
selection means (362) for selectively passing one of said sixth to ninth timing signals and the output of said gate means in response to the outputs of said broadcasting system decision means, said phase detection means and said synchronization detection means, and
means (63) for generating a reset pulse in response to the output of said selection means, said reset pulse generated from said reset pulse generating means resetting counting operation of said counter means.

10. An apparatus in accordance with claim 9, wherein said selective passage means includes:
first selective passage means (425a) for passing the output of said gate means and said eighth timing signal,
second selective passage means (425b) for passing the output of said gate means and said ninth timing signal,
third selective passage means (424) for selectively passing the output of either said first or second selective passage means in response to the outputs of said broadcasting system decision means and said synchronization detection means,
fourth selective passage means (429) for selectively passing either said sixth or seventh timing signal in response to the output of said broadcasting system decision means, and
fifth selective passage means for selectively passing the output of either said third or fourth selective passage means in response to the output of said phase detection means and supplying the selected output to said reset pulse generating means.

11. An apparatus in accordance with claim 8, wherein said gate signal selective passage means includes:
first selective passage means (427) for passing either said fourth or fifth timing signal in response to the output of said broadcasting system decision means,
second selective passage means (428) for selectively passing either said first or second timing signal in response to the output of said broadcasting system decision means, third selective passage means (430) for selectively passing the output of either said first or second selective passage means in response to the output of said phase detection means, and fourth selective passage means (423) for selectively passing either the output of said third selective passage means or said third timing signal in response to the output of said synchronization detection means and supplying the same to said gate means.

12. An apparatus in accordance with claim 8, further comprising:

first signal selection means (418, 419) for selectively passing either said sixth or seventh timing signal in response to the output of said broadcasting system decision means, and second signal selection means (421) for selecting either a set of the output of said gate means and a 10-th timing signal from said counter means or a set of the output from said first signal selection means and said reset pulse in response to the output of said phase detection means and supplying the same to said phase detection means.

13. An apparatus in accordance with claim 12, further including means (419) for delaying said timing signal selected by said first signal selection means by a period for one cycle of said clock signal and supplying the delayed timing signal same to said second signal selection means.

14. An apparatus in accordance with claim 12, further comprising means (420) provided between an input of said second signal selection means and an output of said gate means for holding a supplied signal for a prescribed period.

15. An apparatus in accordance with claim 1, wherein said counter means counts a clock signal having a frequency of even number multiples of that of said vertical synchronization signal.

16. A vertical drive pulse generator comprising:

a gate circuitry (59) for passing vertical synchronizing signals included in video signals of at least first and second broadcasting systems received from an input terminal (57) in response to a control signal, said vertical synchronizing signals of said first and second broadcasting systems being different in frequency from each other;

a reset pulse generator (63) for generating a signal corresponding to said vertical synchronizing signal received from said gate circuitry as the reset pulse;

a counter circuit (60) counting a clock signal having a frequency integral times that of a horizontal synchronizing signal included in said video signal for generating a first timing signal ($\phi6$) entering an active state for a period corresponding to a period in which arrival of said vertical synchronizing signal of said first broadcasting system is expected while generating a second timing signal ($\phi7$) entering an active state for a period corresponding to a period in which arrival of said vertical synchronizing signal of said second broadcasting system is expected on the basis of results of said counting, said counter circuitry generating said vertical drive pulse in response to said reset pulse;

a broadcasting system decision circuitry 965) comparing the phases of said reset pulse and a third timing signal ($\psi4$) providing timing forming the basis of a decision of said broadcasting system from said counter circuitry for deciding whether said arriving vertical synchronizing signal is that of said first broadcasting system or that of said second broadcasting system;

a synchronization detection circuitry (66) for detecting whether or not said reset pulse is generated in a period defined by said first or second timing signal; and a gate signal selection circuitry (67) for selectively passing one of said first and second timing signals and a fourth timing signal ($\psi8$) generated from said counter (60) in response to the outputs of said broadcasting system decision circuitry and said synchronization detection circuitry and applying the same to said gate circuitry for defining a gate period for making said gate circuitry capable of passing signals during supply of the selected timing signal, said first and second timing signals partially overlapping with each other in a gate period, said fourth timing signal defining a gate period including said gate periods defined by said first and second timing signals.

17. A circuit for generating a vertical drive pulse, comprising:

a gate circuitry (59) for passing vertical synchronizing signals included in video signals in accordance with at least first and second broadcasting systems applied to an input terminal (57), said first and second broadcasting systems having different vertical synchronizing signal frequencies;

an input selector (362) generating a signal corresponding to said vertical synchronizing signal passed through said gate circuitry;

a reset pulse generator (63) for generating a reset pulse in response to said signal from said input selection circuit;

a counter (360) counting a clock signal having a frequency integral times that of a horizontal synchronizing signal included in said video signal for generating a first timing signal ($\psi10$) corresponding to a wide period in which arrival of said vertical synchronizing signal of said first broadcasting system is expected, a second timing signal ($\psi8$) corresponding to a narrow period in which arrival of said vertical synchronizing signal is expected, a third timing signal ($\psi11$) corresponding to a wide period in which arrival of said vertical synchronizing signal of said second broadcasting system is expected, a fourth timing signal ($\psi9$) corresponding to a narrow period in which arrival of said vertical synchronizing signal is expected, a fifth timing signal ($\psi1$) having a cycle corresponding to a vertical synchronizing signal cycle defined by said first broadcasting system and a sixth timing signal ($\psi2$) having a cycle corresponding to a vertical synchronizing signal cycle defined by said second broadcasting system on the basis of values of said counting, counting operation of said counter circuit being reset in response to said reset pulse from said reset pulse generator, said counter circuit generating said vertical drive pulse upon reset;

a broadcasting system decider (365) for deciding whether said reset pulse is generated within a period defined corresponding to said first broadcasting system or within a period defined corresponding to said second broadcasting system in response to said reset pulse;

a first signal selector (94180) for selecting one of said fifth and sixth timing signals in response to a decision output from the broadcasting system decision circuit;

a phase comparator (422) for comparing the phases of the output from said gate circuitry and an output signal from said first signal selector;

a gate signal selector (367) for applying one of said first to fourth timing signals to said gate circuitry as said control signal in response to the output signal of said phase comparator and a decision output of said broadcasting system decider; and a synchronization detection circuit (366) for detecting, in response to said reset signal, that said counter circuitry is not reset in response to said vertical synchronizing signal from said gate circuitry but reset by a timing signal generated by said counter itself in a self-reset state, said gate signal selector applying a seventh timing signal ($\psi 12$) from said counter to said gate circuitry as said control signal in response to an output signal of said synchronization detector, said seventh timing signal defining a gate period corresponding to a wide period in which arrival of said vertical synchronizing signals of said first and second broadcasting systems is expected and including said gate periods defined by said first and third timing signals, said gate periods defined by said first and third timing signals partially overlapping with each other in a certain range.

18. A method of generating a vertical drive pulse being synchronous with a vertical synchronizing signal included in an externally supplied video signal in accordance with a vertical countdown system, said method comprising:

a step of receiving and passing vertical synchronizing signals included in video signals in accordance with at least first and second broadcasting systems by and through a gate circuit (59);

a step of generating a reset pulse corresponding to said passed vertical synchronizing signal;

a step of counting a signal having a frequency integral times that of a horizontal synchronizing signal of said video signal for generating at least a first timing signal ($\phi 6$) corresponding to a period in which arrival of said vertical synchronizing signal of said first broadcasting system is expected, a second timing signal ($\phi 7$) corresponding to a period in which arrival of said vertical synchronizing signal of said second broadcasting system is expected and a third timing signal ($\phi 8$) corresponding to a period including said periods defines by said first and second timing signals, said counting operation being reset by said reset pulse, said vertical drive pulse being generated in response to said reset pulse;

a step of deciding whether said vertical synchronizing signal arriving at said gate circuit is that of said first broadcasting system or that of said second broadcasting system in response to said reset pulse; and a synchronization detecting step of detecting whether or not said counting operation is reset by said vertical synchronizing signal from said gate circuit in response to said reset pulse signal, a step of supplying either said first or third timing signal to said gate circuit in response to the result of decision at said broadcasting system deciding step and the result of detection at said synchronization detecting step thereby to set a signal passage period of said gate circuit in three types of gate periods defined by said first timing signal, said second timing signal and said third timing signal, respectively, said gate periods defined by said first timing signal and said second timing signal partially overlapping with each other in a certain range.

19. A method of generating a vertical drive pulse being synchronous with a vertical synchronizing signal included in an externally supplied video signal, comprising:

a step of receiving and passing vertical synchronizing signals included in video signals of at least first and second broadcasting signals by and through one gate circuit (59), said vertical synchronizing signals of said first and second broadcasting systems having different cycles;

a step o generating a reset signal corresponding to said passed vertical synchronizing signal, said vertical drive pulse being generated in response to said reset signal;

a step of counting a signal having a frequency integral times that a horizontal synchronizing signal included in said video signal for generating a first timing signal ($\psi 10$) defining a wide period in which arrival of said vertical synchronizing signal of said first broadcasting system is expected, a second timing signal ($\psi 8$) defining a narrow period in which arrival of said vertical synchronizing signal of said first broadcasting system is expected, a third timing signal ($\psi 11$) defining a wide period in which arrival of said vertical synchronizing signal of said second broadcasting system is expected, a fourth timing signal (104 9) defining a narrow period in which arrival of said vertical synchronizing signal of said second broadcasting system is expected, a fifth timing signal ($\psi 1$) having a cycle corresponding to that of said vertical synchronizing signal of said first broadcasting system, a sixth timing signal ($\psi 2$) having a cycle corresponding to that of said vertical synchronizing signal of said second broadcasting system and a seventh timing signal ($\psi 12$) defining a wide period in which arrival of said vertical synchronizing signal of either said first or second broadcasting system is expected, on the basis of the results of said counting;

a step of deciding whether said vertical synchronizing signal arriving at said gate circuit is of said first broadcasting system or said second broadcasting system, on the basis of said reset signals;

a step of selecting either said fifth timing signal or said sixth timing signal according to the result of said decision at said broadcasting system deciding step;

a step of comparing the phases of a signal corresponding to said vertical synchronizing signal supplied from said gate circuit and said selected one of said fifth and sixth timing signals, a step of applying one of said first to fourth timing signals to said gate circuit as a control signal on the basis of the result of phase comparison at said phase comparing step and the result of said decision at said broadcasting system deciding step for making said gate circuit capable of signal passage for a period defined by said selected timing signal;

a step of detecting, in response to said reset signal, whether or not said counting operation is reset in response to said vertical synchronizing signal from said gate circuit in a self-reset state; and a step of applying said seventh timing signal to said gate circuits as said control circuit in response to the result of said decision at said self-reset detecting step.

* * * * *